United States Patent
Kubota

(10) Patent No.: US 10,203,670 B2
(45) Date of Patent: Feb. 12, 2019

(54) INFORMATION PROCESSING EQUIPMENT AND METHOD FOR CONTROLLING INFORMATION PROCESSING EQUIPMENT

(71) Applicant: FUJITSU LIMITED, Kawasaki-shi, Kanagawa (JP)

(72) Inventor: Jumpei Kubota, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 939 days.

(21) Appl. No.: 14/715,997

(22) Filed: May 19, 2015

(65) Prior Publication Data

US 2015/0355643 A1  Dec. 10, 2015

(30) Foreign Application Priority Data

Jun. 6, 2014  (JP) .................. 2014-117834

(51) Int. Cl.
G06F 9/50 (2006.01)
G05B 15/02 (2006.01)
G05D 23/19 (2006.01)

(52) U.S. Cl.
CPC ......... *G05B 15/02* (2013.01); *G05D 23/1917* (2013.01)

(58) Field of Classification Search
CPC ................ G06F 9/5094; G06F 1/206
See application file for complete search history.

(56) References Cited

U.S. PATENT DOCUMENTS

| 5,058,389 A | 10/1991 | Yasuda et al. |
| 2006/0013281 A1 | 1/2006 | Sri-Jayantha et al. |
| 2007/0213881 A1* | 9/2007 | Belady ............... G05D 23/19 700/300 |
| 2009/0327778 A1* | 12/2009 | Shiga ............... G05D 23/1919 713/320 |
| 2011/0010717 A1 | 1/2011 | Yamaoka et al. |
| 2011/0126206 A1 | 5/2011 | Kato et al. |

FOREIGN PATENT DOCUMENTS

| JP | 2-275275 | 11/1990 |
| JP | 2004-126968 | 4/2004 |
| JP | 2008-507744 | 3/2008 |
| JP | 2008-242616 | 10/2008 |
| JP | 2011-18131 | 1/2011 |
| WO | 2010/050249 A1 | 5/2010 |

\* cited by examiner

*Primary Examiner* — Thomas L Dickey
(74) *Attorney, Agent, or Firm* — Staas & Halsey LLP

(57) ABSTRACT

Information processing equipment includes: arithmetic processing units configured to execute jobs, respectively; a supply channel through which a coolant flows, the coolant absorbing heat generated by the arithmetic processing units; a circulating device configured to circulate the coolant in the supply channel through an outlet to output the coolant; and a job allocation device configured to allocate a job, when allocating the jobs to the arithmetic processing units, to a job non-execution arithmetic processing unit, if any, that is the arithmetic processing unit executing no job among the arithmetic processing units, the job non-execution arithmetic processing unit being positioned closer to the outlet side on the supply channel.

9 Claims, 19 Drawing Sheets

FIG. 8

| CPU | OPERATING STATUS | COOLANT TEMPERATURE INFORMATION |
|---|---|---|
| CPU1 | OPERATING | 1 |
| CPU2 | NON-OPERATING | 3 |
| CPU3 | NON-OPERATING | 2 |

(RAM, 30; PGMa; TBL3a)

FIG. 11

ROM 20 — PGMb — TBL2b

| CPU | MOUNTING POSITION |
|---|---|
| CPU11 | 1 |
| CPU12 | 2 |
| CPU13 | 3 |
| CPU14 | 4 |
| CPU21 | 1 |
| CPU22 | 2 |
| CPU23 | 3 |
| CPU24 | 4 |
| CPU31 | 1 |
| CPU32 | 2 |
| CPU33 | 3 |
| CPU34 | 4 |

TRANSFERRED WHEN IPEb IS TURNED ON ⇒

RAM 30 — PGMb — TBL3b

| CPU | MOUNTING POSITION | OPERATING STATUS | COOLANT TEMPERATURE INFORMATION |
|---|---|---|---|
| CPU11 | 1 | OPERATING | 2 |
| CPU12 | 2 | OPERATING | |
| CPU13 | 3 | NON-OPERATING | |
| CPU14 | 4 | NON-OPERATING | |
| CPU21 | 1 | NON-OPERATING | 3 |
| CPU22 | 2 | OPERATING | |
| CPU23 | 3 | OPERATING | |
| CPU24 | 4 | NON-OPERATING | |
| CPU31 | 1 | OPERATING | 1 |
| CPU32 | 2 | NON-OPERATING | |
| CPU33 | 3 | OPERATING | |
| CPU34 | 4 | NON-OPERATING | |

FIG. 13

RAM 30

PGMd

TBL3d

| CPU | MOUNTING POSITION | OPERATING STATUS | COOLANT TEMPERATURE INFORMATION |
|---|---|---|---|
| CPU11 | 1 | OPERATING | 32 °C |
| CPU12 | 2 | OPERATING | |
| CPU13 | 3 | NON-OPERATING | |
| CPU14 | 4 | NON-OPERATING | |
| CPU21 | 1 | NON-OPERATING | 37 °C |
| CPU22 | 2 | OPERATING | |
| CPU23 | 3 | OPERATING | |
| CPU24 | 4 | NON-OPERATING | |
| CPU31 | 1 | NON-OPERATING | 28 °C |
| CPU32 | 2 | OPERATING | |
| CPU33 | 3 | OPERATING | |
| CPU34 | 4 | NON-OPERATING | |

ROM 20

PGMd

TBL2b

FIG. 17

| CPU | OPERATING STATUS | COOLANT TEMPERATURE INFORMATION |
|---|---|---|
| CPU11 | OPERATING | 32 °C |
| CPU12 | OPERATING | |
| CPU13 | NON-OPERATING | |
| CPU14 | OPERATING | |
| CPU21 | OPERATING | 30 °C |
| CPU22 | NON-OPERATING | |
| CPU23 | OPERATING | |
| CPU24 | OPERATING | |
| CPU31 | OPERATING | 28 °C |
| CPU32 | NON-OPERATING | |
| CPU33 | OPERATING | |
| CPU34 | OPERATING | |

TBL3e

| CPU | OPERATING STATUS | COOLANT TEMPERATURE INFORMATION |
|---|---|---|
| CPU11 | OPERATING | 32 °C |
| CPU12 | OPERATING | |
| CPU13 | NON-OPERATING | |
| CPU14 | OPERATING | |
| CPU21 | OPERATING | 30 °C |
| CPU22 | NON-OPERATING | |
| CPU23 | OPERATING | |
| CPU24 | OPERATING | |
| CPU31 | OPERATING | 28 °C |
| CPU32 | NON-OPERATING | |
| CPU33 | OPERATING | |
| CPU34 | OPERATING | |

TBL3e

FIG. 18

TBL2f, TBL3f

| CPU | CPU11 | CPU12 | CPU13 | CPU14 | CPU21 | CPU22 | CPU23 | CPU24 | CPU31 | CPU32 | CPU33 | CPU34 |
|---|---|---|---|---|---|---|---|---|---|---|---|---|
| CPU11 | | 1 | 2 | 3 | 4 | 5 | 6 | 5 | 7 | 8 | 9 | 10 |
| CPU12 | — | | 1 | 2 | 5 | 4 | 5 | 6 | 8 | 7 | 8 | 9 |
| CPU13 | — | — | | 1 | 6 | ☒5☒ | 4 | 5 | ☒9☒ | ⊗8⊗ | 7 | 8 |
| CPU14 | — | — | — | | 5 | 6 | 5 | 4 | 8 | 9 | 8 | 7 |
| CPU21 | — | — | — | — | | 1 | 2 | 3 | 4 | 5 | 6 | 5 |
| CPU22 | — | — | — | — | — | | 1 | 2 | ☒5☒ | ⊗4⊗ | 5 | 6 |
| CPU23 | — | — | — | — | — | — | | 1 | 6 | 5 | 4 | 5 |
| CPU24 | — | — | — | — | — | — | — | | 5 | 6 | 5 | 4 |
| CPU31 | — | — | — | — | — | — | — | — | | 1 | 2 | 3 |
| CPU32 | — | — | — | — | — | — | — | — | — | | 1 | 2 |
| CPU33 | — | — | — | — | — | — | — | — | — | — | | 1 |
| CPU34 | — | — | — | — | — | — | — | — | — | — | — | |

INFORMATION PROCESSING EQUIPMENT AND METHOD FOR CONTROLLING INFORMATION PROCESSING EQUIPMENT

CROSS-REFERENCE TO RELATED APPLICATION

This application is based upon and claims the benefit of priority of the prior Japanese Patent Application No. 2014-117834, filed on Jun. 6, 2014, the entire contents of which are incorporated herein by reference.

FIELD

The embodiments discussed herein are related to information processing equipment and a method for controlling the information processing equipment.

BACKGROUND

With the recent increase in processing capability of an arithmetic processing unit such as a central processing unit (CPU), an amount of heat generated by the arithmetic processing unit tends to be increased. In order to suppress a temperature rise due to the heat generated by the arithmetic processing unit, a cold blast is supplied toward the arithmetic processing unit, or a coolant is circulated through a supply channel that comes into contact with the arithmetic processing unit.

For example, there has been proposed a method for predicting, based on information such as temperatures and power consumption of arithmetic processing units, a temperature change in each of the arithmetic processing units when a job is allocated to the arithmetic processing unit, and thus suppressing reduction in capabilities of the arithmetic processing units (see, for example, Japanese Laid-open Patent Publication No. 2008-242616).

There has been proposed a method for obtaining power efficiency including power consumption of each of information processing equipment, power for cooling the information processing equipment, and the like, and preferentially allocating a job to the information processing equipment with high power efficiency (see, for example, International Publication Pamphlet No. WO 2010/050249).

There has been proposed a method for estimating temperature changes at more than one position on a processor chip, and diverting cooling ability to the position with the temperature estimated to be higher than a predetermined threshold (see, for example, Japanese National Publication of International Patent Application No. 2008-507744).

There has been proposed a method for measuring a temperature of a coolant that cools an arithmetic processing unit, controlling operations of the arithmetic processing unit and operations of a refrigerator to cool the coolant, according to the temperature of the coolant, and allowing the temperature of the coolant to quickly reach a preset temperature (see, for example, Japanese Laid-open Patent Publication No. 02-275275).

There has been proposed a method for measuring temperatures of arithmetic processing units with temperature sensors, and determining the arithmetic processing unit, to which a job is to be submitted, in ascending order of ambient temperature based on a distribution of the measured temperatures. (see, for example, Japanese Laid-open Patent Publication No. 2004-126968).

There has been proposed a method for calculating power consumption of arithmetic processing units based on a temperature of each of the arithmetic processing units and an amount of cold blast supplied to the arithmetic processing unit, and submitting a job to the arithmetic processing unit from the one with low power consumption (see, for example, Japanese Laid-open Patent Publication No. 2011-18131).

When arithmetic processing units are sequentially disposed on a supply channel for a coolant, for example, the temperature of the coolant flowing through the supply channel is gradually increased by absorbing heat generated by the arithmetic processing units.

As to the cooling ability of the arithmetic processing unit using the coolant, the lower the temperature of the coolant, the higher the cooling ability.

Thus, the cooling ability of the coolant to cool the arithmetic processing unit disposed on the supply channel on the side where the coolant flows in is higher than the cooling ability of the coolant to cool the arithmetic processing unit disposed on the supply channel on the side where the coolant flows out.

However, there has been proposed no method for determining a job to be allocated to the arithmetic processing unit according to the cooling ability of the coolant flowing through the supply channel.

The heat not absorbed by the coolant among the heat generated by the arithmetic processing units is removed by an air conditioner or the like installed in a room provided with information processing equipment including the arithmetic processing units.

Therefore, an increase in heat not absorbed by the coolant leads to an increase in power consumption of the air conditioner and the like.

SUMMARY

According to an aspect of the invention, information processing equipment includes: arithmetic processing units configured to execute jobs, respectively; a supply channel through which a coolant flows, the coolant absorbing heat generated by the arithmetic processing units; a circulating device configured to circulate the coolant in the supply channel through an outlet to output the coolant; and a job allocation device configured to allocate a job, when allocating the jobs to the arithmetic processing units, to a job non-execution arithmetic processing unit, if any, that is the arithmetic processing unit executing no job among the arithmetic processing units, the job non-execution arithmetic processing unit being positioned closer to the outlet side on the supply channel.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 is a diagram illustrating an example of information stored in a RAM illustrated in FIG. 7;

FIG. 11 is a diagram illustrating an example of information stored in a ROM and a RAM illustrated in FIG. 10;

FIG. 13 is a diagram illustrating an example of information stored in a ROM and a RAM according to another embodiment of the information processing equipment;

FIG. 17 is a diagram illustrating an example of information stored in a table allocated to a RAM illustrated in FIG. 16;

FIG. 18 is a diagram illustrating an example of information allocated to a ROM and the RAM illustrated in FIG. 16.

DESCRIPTION OF EMBODIMENTS

Hereinafter, embodiments are described with reference to the drawings.

Figure 1:
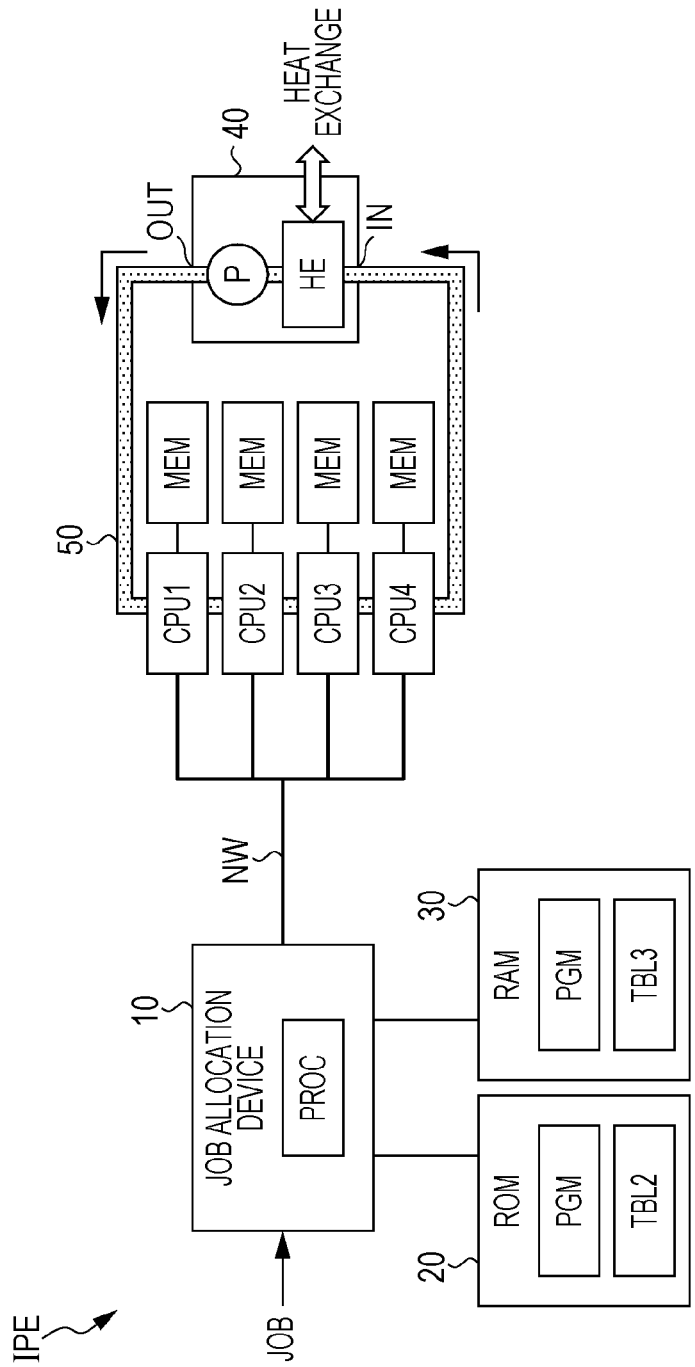
FIG. 1 is a diagram illustrating an embodiment of information processing equipment and a method and a program for controlling the information processing equipment.

FIG. 1 illustrates an embodiment of information processing equipment and a method and a program for controlling the information processing equipment. The information processing equipment IPE illustrated in FIG. 1 includes a job allocation device 10, and a read only memory (ROM) 20, and a random access memory (RAM) 30, which are connected to the job allocation device 10. The information processing equipment IPE also includes central processing units (CPU1, CPU2, CPU3, and CPU4) and memories MEMs connected to the CPU1 to CPU4, respectively. The CPU is an example of an arithmetic processing unit configured to execute jobs. For example, each of the memories MEMs stores data and the like to be handled in a program to be executed by the CPU and a job to be executed by the CPU. For example, the CPU1 to CPU4 operate with the same specifications (kind, clock frequency, power-supply voltage and the like), and generate approximately the same amount of heat when executing a common job. Note that the number of CPUs included in the information processing equipment IPE is not limited to four.

Figure 3:
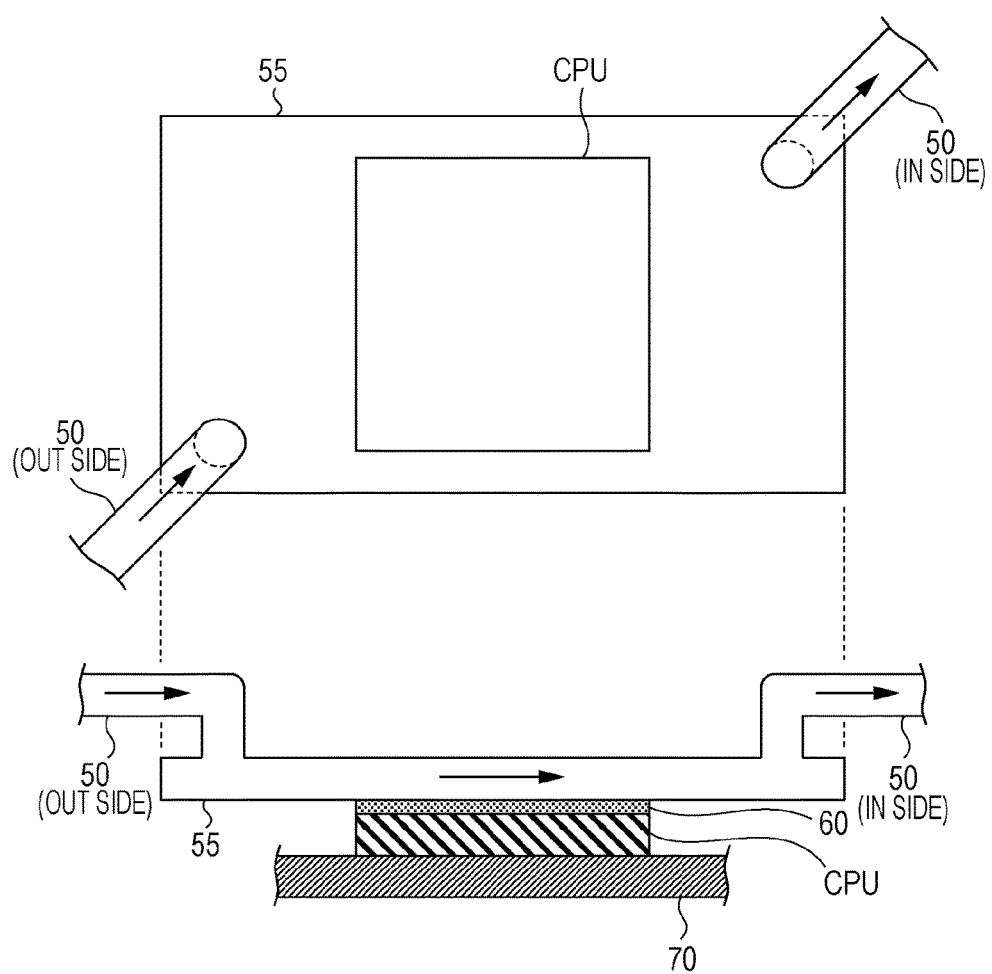
FIG. 3 is a diagram illustrating an example of a structure of a contact portion between a CPU and a supply channel illustrated in FIG. 1.

The information processing equipment IPE further includes a circulating device 40 for a coolant, and a supply channel 50 connected between the circulating device 40 and the CPU1 to CPU4, through which the coolant flows. The coolant is an example of a refrigerant that absorbs heat generated by the CPUs. Note that a gas such as a coolant gas may flow, instead of the coolant, through the supply channel 50. Note that each of the CPU1 to CPU4 comes into contact with the supply channel 50. The shaded area illustrated in the supply channel 50 represents the coolant. FIG. 3 illustrates an example of a structure of a contact portion between each of the CPUs and the supply channel 50.

For example, the circulating device 40 includes: a pump P configured to deliver the coolant to the supply channel 50; and a heat exchanger HE configured to cool the coolant that has absorbed the heat generated by the CPU1 to CPU4. The coolant outputted from the pump P is outputted to the supply channel 50 from an outlet OUT of the circulating device 40, and is returned to an inlet IN of the circulating device 40 after cooling the CPU1 to CPU4 in this order. For example, the position of the CPU1 on the supply channel 50 is closer to the outlet OUT than the CPU2 to CPU4, the position of the CPU2 on the supply channel 50 is closer to the outlet OUT than the CPU3 and CPU4, and the position of the CPU3 on the supply channel 50 is closer to the outlet OUT than the CPU4. The coolant returned to the inlet IN is subjected to heat exchange by the heat exchanger HE, and then outputted from the outlet OUT again by drive force of the pump P. In FIG. 1, the direction of the flow of the coolant inside the supply channel 50 circularly connected through the circulating device 40 is indicated by the arrows.

The circulating device 40, the supply channel 50, and the coolant flowing through the supply channel 50 constitute a cooling system for cooling the CPU1 to CPU4. For example, the information processing equipment IPE is installed in a room that may be cooled by an air conditioner. Note that a supply device configured to supply the coolant to the supply channel 50 without circulating the coolant may be provided instead of the circulating device 40. In this case, such a coolant supply device includes no heat exchanger HE.

The ROM 20 includes a region for storing a program PGM to be executed by the job allocation device 10 and a table TBL2 storing information indicating the order of arrangement of the CPU1 to CPU4 on the supply channel 50. The RAM 30 includes a region for storing the program PGM transferred from the ROM 20 and a region for storing a table TBL3. The table TBL3 stores the information included in the table TBL2 transferred from the ROM 20 and information indicating an operating status of each of the CPU1 to CPU4. The program PGM is an example of a control program for the information processing equipment IPE, which is executed by the job allocation device 10 to allocate jobs executed by the CPU1 to CPU4 to the CPU1 to CPU4. For example, the transfer of the program PGM and the information stored in the table TBL2 from the ROM 20 to the RAM 30 is executed when the information processing equipment IPE is turned on.

For example, the job allocation device 10 is connected to the CPU1 to CPU4 through a network NW. The network NW is an example of a communication path. The job allocation device 10 includes a processor PROC configured to execute the program PGM stored in the RAM 30, and operates the processor PROC to allocate jobs to the CPUs and submit the job allocated through the network NW to any of the CPUs. In this event, the job allocation device 10 determines the CPU to which the job is to be allocated, by referring to the information stored in the table TBL3. The control for allocating the jobs to the CPUs by the job allocation device 10 is described with reference to FIGS. 4 and 5. For example, jobs are supplied from a higher-level device such as a user device using the information processing equipment IPE.

Figure 2:
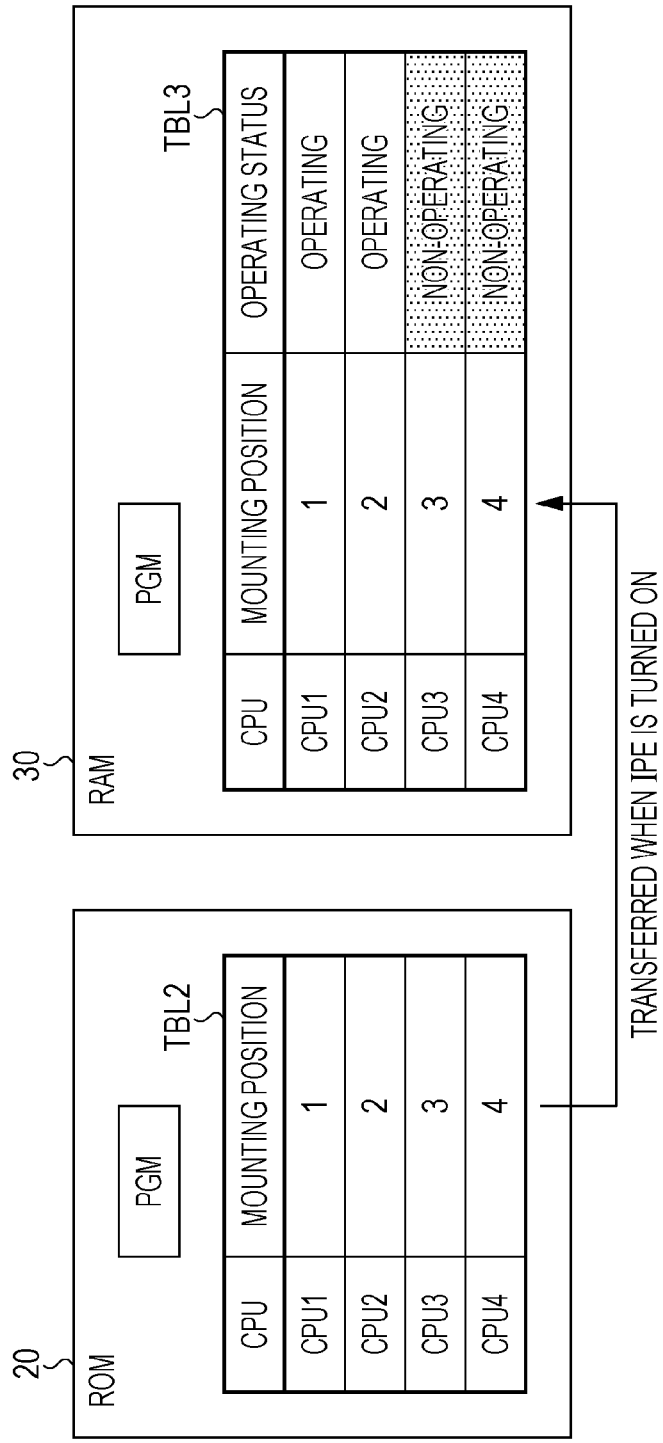
FIG. 2 is a diagram illustrating an example of information stored in a ROM and a RAM illustrated in FIG. 1.

FIG. 2 illustrates an example of information stored in the ROM 20 and the RAM 30 illustrated in FIG. 1.

The table TBL2 allocated to the ROM 20 includes a region for storing a mounting position that is information indicating the position of each of the CPU1 to CPU4 on the supply channel 50. The region for the "mounting position" stores, for example, numbers indicating the order of the CPUs from the one closer to the outlet OUT for outputting the coolant in the circulating device 40. In the example illustrated in FIG. 2, "1" is stored in the region for the "mounting position" corresponding to the CPU1 closer to the outlet OUT than the other CPU2 to CPU4. Meanwhile, "4" is stored in the region for the "mounting position" corresponding to the CPU4 farther away from the outlet OUT than the other CPU1 to CPU3.

The table TBL3 allocated to the RAM 30 includes a region for storing the information on the "mounting position" transferred from the table TBL2 and a region for storing the information indicating the operating status of the CPU1 to CPU4. As described with reference to FIG. 1, the information on the "mounting position" is transferred from the table TBL2 to the table TBL3 when the information processing equipment IPE is turned on.

The region for the "operating status" is set as a state indicating "operating" when the job allocation device 10 submits jobs to the CPU1 to CPU4, and as a state indicating "non-operating" when the jobs are completed. In FIG. 2, the regions set as "non-operating" are indicated as shaded regions. Note that "1" indicating "operating" or "0" indicating "non-operating", for example, may be stored in the region for the "operating status".

FIG. 3 illustrates a structure of a contact portion between the CPU (CPU1 to CPU4) and the supply channel 50 illustrated in FIG. 1. For example, the supply channel 50 includes a flat extended portion 55 that comes into contact with the surface of the CPU through a thermally-conductive member 60 such as a thermal sheet or grease. The extended portion 55 is called a cooling plate or a water-cooling jacket, for example. The extended portions 55 that come into contact with the CPU1 to CPU4 have the same shape and have the same contact area with the CPU1 to CPU4. A portion of the supply channel 50 other than the extended portion 55 has a tube shape, for example, and the tube-shaped portion has a fixed inside diameter regardless of the position. For example, the CPU is soldered onto a printed circuit board 70. In FIG. 3, the flow direction of the coolant is indicated by the arrows. Note that the extended portion 55 may come into direct contact with the CPU without through the member 60.

The coolant flowing into the extended portion 55 after outputted to the supply channel 50 from the outlet OUT of the circulating device 40 absorbs heat generated by the CPU through the thermally-conductive member 60. The coolant having the temperature increased by absorbing the heat is outputted from the extended portion 55 and then flows toward the inlet IN of the circulating device 40.

For example, a flow rate per unit time of the coolant outputted by the circulating device 40 is fixed, and a flow speed of the coolant flowing through the tube-shaped portion of the supply channel 50 is fixed. Therefore, when the coolants flowing through the respective extended portions 55 that come into contact with the CPU1 to CPU4 have the same temperature, the amounts of heat to be absorbed by the coolants out of the amounts of heat generated by the CPU1 to CPU4 are the same. Thus, the CPU1 to CPU4 have the same cooling efficiency using the coolant.

When a liquid flowing on a flat plate with a uniform temperature is a laminar flow, a relationship of Expression (1) is known assuming that a Reynolds number Re is "ul/v" and a Prandtl number Pr is v/α.

$$Q = 0.664 Re v^{1/2} Pr^{1/3} (\lambda/l)(Ts-Tf)S \quad (1)$$

As for the Reynolds number Re, u is a flow speed of the coolant, l is a scale length, and v is a kinematic viscosity coefficient. For example, the scale length l is a value obtained by converting the portion of the extended portion 55 or the like, which comes into contact with the CPU, to the length of a flow path. As for the Prandtl number Pr, α is a temperature conductivity. λ, v and α are substance-specific values and are slightly temperature dependent. In Expression (1), Q is an amount of heat absorbed by the coolant out of the amount of heat generated by the CPU, λ is a thermal conductivity of the liquid, Ts is the temperature of the CPU, Tf is the temperature of the liquid, and S is a contact area between the CPU and the extended portion 55 or the like, through which the liquid flows.

When the CPU temperature Ts exceeds a predetermined temperature, the CPU has difficulty in normally operating. According to Expression (1), the amount of heat absorbed Q that is allowed to keep the CPU temperature Ts at or below the predetermined temperature is reduced with increase in the temperature Tf of the coolant.

The coolant outputted from the extended portion 55 that comes into contact with the CPU1 flows into the extended portion 55 that comes into contact with the CPU2. Also, the coolant outputted from the extended portion 55 that comes into contact with the CPU2 flows into the extended portion 55 that comes into contact with the CPU3. Thus, the temperature Tf of the coolant flowing into the extended portion 55 that comes into contact with the CPU1 is lower than the temperature Tf of the coolant flowing into the extended portion 55 that comes into contact with the CPU2. Likewise, the temperature Tf of the coolant flowing into the extended portion 55 that comes into contact with the CPU2 is lower than the temperature Tf of the coolant flowing into the extended portion 55 that comes into contact with the CPU3. Therefore, as to the amount of heat generated Q that is allowed for each of the CPU1 to CPU4, which come into contact with the common supply channel 50, the CPU closer to the outlet OUT of the circulating device 40 has a larger amount. In other words, the extended portion 55 closer to the outlet OUT of the circulating device 40 has a higher ability to cool the CPU. Therefore, as to the value stored in the "mounting position" in the table TBL3 illustrated in FIG. 2, the smaller value indicates the higher ability to cool the CPU. More specifically, in the cooling structure of the CPU illustrated in FIG. 1, the ability to cool the CPU1 is higher than the ability to cool the CPU2, the ability to cool the CPU2 is higher than the ability to cool the CPU3, and the ability to cool the CPU3 is higher than the ability to cool the CPU4.

Figure 4:
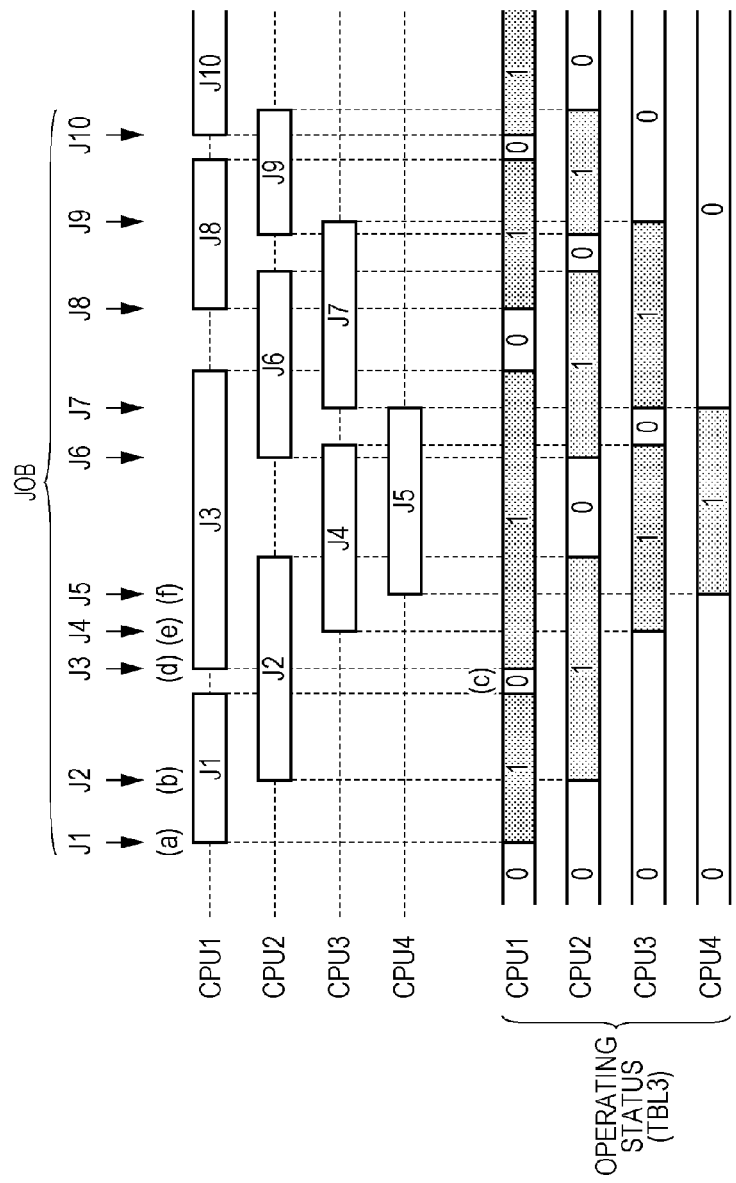
FIG. 4 is a diagram illustrating an example of jobs submitted to the CPUs by a job allocation device illustrated in FIG. 1.

FIG. 4 illustrates an example of a job to be submitted to the CPU by the job allocation device 10 illustrated in FIG. 1. In the example illustrated in FIG. 4, the job allocation device 10 allocates ten jobs J1 to J10 to any of the CPU1 to CPU4, and submits the allocated jobs. In the region of "operating status" in the table TBL3 (FIG. 1) illustrated in the lower part of FIG. 4, "0" indicates "non-operating" and "1" indicates "operating". In FIG. 4, the regions of "operating status" indicating "1" (in other words, "operating") in the table TBL3 are indicated as shaded regions. The "non-operating" CPU is an example of an arithmetic processing unit executing no jobs.

First, in an initial state where no jobs are submitted, the regions of "operating status" in the table TBL3 are all set as "non-operating" (in other words, "0"). The job allocation device 10 receives an instruction to submit the job J1 from the higher-level device. The job allocation device 10 allocates the job J1 to the CPU1 having the smallest value of "mounting position" among the "non-operating" CPU1 to CPU4 by referring to the table TBL3, and submits the allocated job ((a) in FIG. 4).

Next, the job allocation device 10 receives an instruction to submit the job J2 from the higher-level device. The job allocation device 10 allocates the job J2 to the CPU2 having the smallest value of "mounting position" among the "non-operating" CPU2 to CPU4 by referring to the table TBL3, and submits the allocated job ((b) in FIG. 4).

Then, the job allocation device 10 receives an instruction to submit the job J3 from the higher-level device. Upon receipt of the instruction to submit the job J3, the CPU1 is finished with the execution of the job J1, and the region of "operating status" corresponding to the CPU1 is set to "0" ((c) in FIG. 4). The job allocation device 10 allocates the job J3 to the CPU1 having the smallest value of "mounting position" among the "non-operating" CPU1, CPU3, and CPU4 by referring to the table TBL3, and submits the allocated job ((d) in FIG. 4).

Thereafter, the job allocation device 10 receives an instruction to submit the job J4 from the higher-level device. The job allocation device 10 allocates the job J4 to the CPU3 having the smallest value of "mounting position" between the "non-operating" CPU3 and CPU4 by referring to the table TBL3, and submits the allocated job ((e) in FIG. 4). Subsequently, the job allocation device 10 receives an instruction to submit the job J5 from the higher-level device. The job allocation device 10 allocates the job J5 to the CPU4 since the "non-operating" CPU is the CPU4 by referring to the table TBL3, and submits the allocated job ((f) in FIG. 4). Note that, when there is no "non-operating" CPU, the job allocation device 10 executes job submission standby processing.

Thereafter, upon every receipt of instructions to submit the jobs J6 to 310 from the higher-level device, the job allocation device 10 refers to the table TBL3. Then, the job allocation device 10 allocates the jobs J6 to 310 to the CPU having the smallest value of "mounting position" among the "non-operating" CPUs. As indicated as the shaded regions in FIG. 4, the frequency of job executions by the CPU that comes into contact with the extended portion 55 (FIG. 3) with high cooling ability is higher than the frequency of job executions by the CPU that comes into contact with the extended portion 55 with low cooling ability.

Accordingly, compared with the case where the jobs are randomly allocated to the CPU1 to CPU4, for example, heat generated by the CPU1 to CPU4 may be efficiently absorbed by the coolant. Therefore, compared with the case where the jobs are randomly allocated to the CPU1 to CPU4, the amount of heat emitted from the CPU1 to CPU4 into the room where the information processing equipment IPE is installed may be reduced. As a result, power consumed by the air conditioner to cool the room where the information processing equipment IPE is installed may be suppressed.

Moreover, in the information processing equipment IPE illustrated in FIG. 1, the CPU whose temperature exceeds an allowable value has difficulty in operating. Thus, when the temperature of any one of the CPU1 to CPU4 exceeds the allowable value, the information processing equipment IPE has difficulty in continuing the job execution. In this embodiment, the frequency of job executions by the CPU that comes into contact with the extended portion 55 with low cooling ability is lower than the frequency of job executions by the CPU that comes into contact with the extended portion 55 with high cooling ability. Therefore, it is possible to reduce the possibility that the temperature of the CPU that comes into contact with the extended portion 55 with low cooling ability exceeds the allowable value. In other words, failures in the information processing equipment IPE may be suppressed from occurring when the temperatures of the CPU1 to CPU4 exceed the allowable value.

Figure 5:
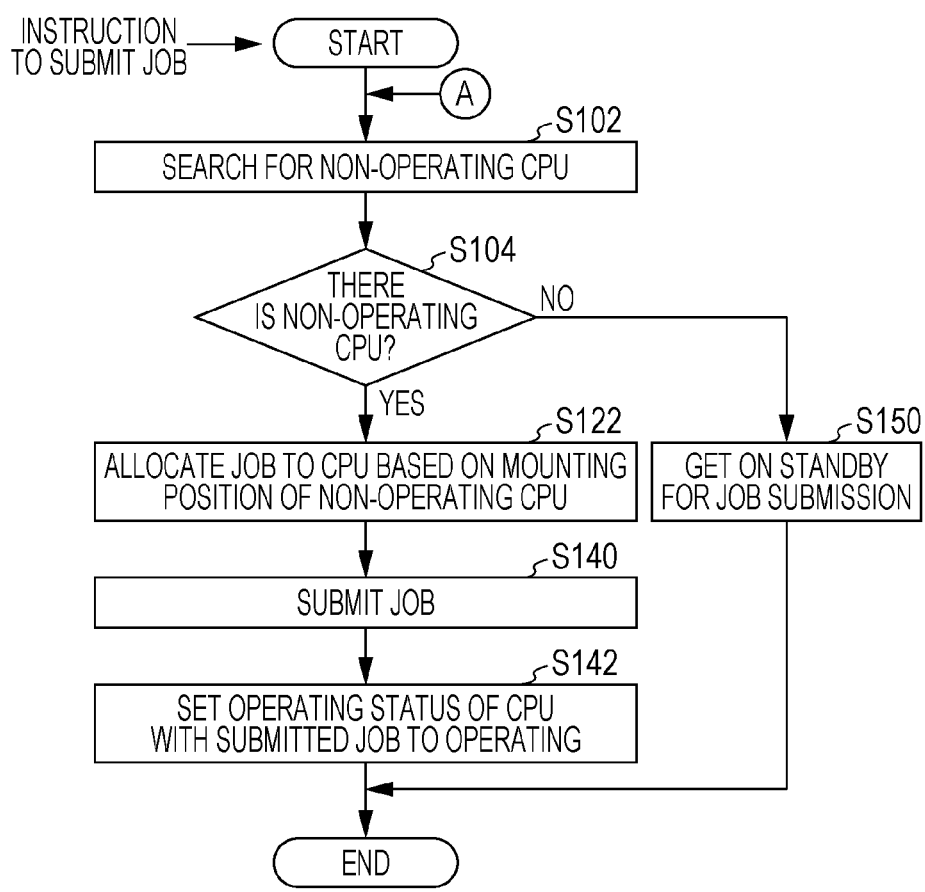
FIG. 5 is a flowchart illustrating an example of processing executed by the job allocation device illustrated in FIG. 1 upon submission of a job.

FIG. 5 illustrates an example of processing executed by the job allocation device illustrated in FIG. 1 upon submission of a job. The flow illustrated in FIG. 5 is processed by the job allocation device 10 executing the program PGM. More specifically, FIG. 5 illustrates an example of a method and a program for controlling the information processing equipment IPE. The flow illustrated in FIG. 5 is started based on an instruction to submit a job received from the higher-level device.

First, in Step S102, upon receipt of the instruction to submit a job from the higher-level device, the job allocation device 10 searches for a non-operating CPU by referring to the table TBL3. From the table TBL3 illustrated in FIG. 2, for example, the CPU3 and CPU4 are found to be non-operating. Next, in Step S104, the job allocation device 10 determines whether or not there is a non-operating CPU. When there is a non-operating CPU, the processing moves to Step S122. On the other hand, when there is no non-operating CPU, the processing moves to Step S150.

In Step S122, the job allocation device 10 reads the information on "mounting position" corresponding to the non-operating CPU by referring to the table TBL3, and allocates the job to the CPU corresponding to the "mounting position" with the smallest value. In other words, when there is a CPU executing no job, the job allocation device 10 allocates the job from the CPU positioned closer to the outlet OUT side. In the table TBL3 illustrated in FIG. 2, for example, the job is allocated to the CPU3. Next, in Step S140, the job allocation device 10 submits the job allocated in Step S122 to the CPU.

Then, in Step S142, the job allocation device 10 sets the region of "operating status" corresponding to the CPU, to which the job is submitted, to "operating" (in other words, "1") in the table TBL3, and then terminates the processing. In the table TBL3 illustrated in FIG. 2, for example, the information of "operating status" corresponding to the CPU3, to which the job is submitted, is changed from "non-operating" to "operating". On the other hand, when there is no non-operating CPU, the job allocation device 10 executes job submission standby processing in Step S150, and then terminates the processing.

Figure 6:
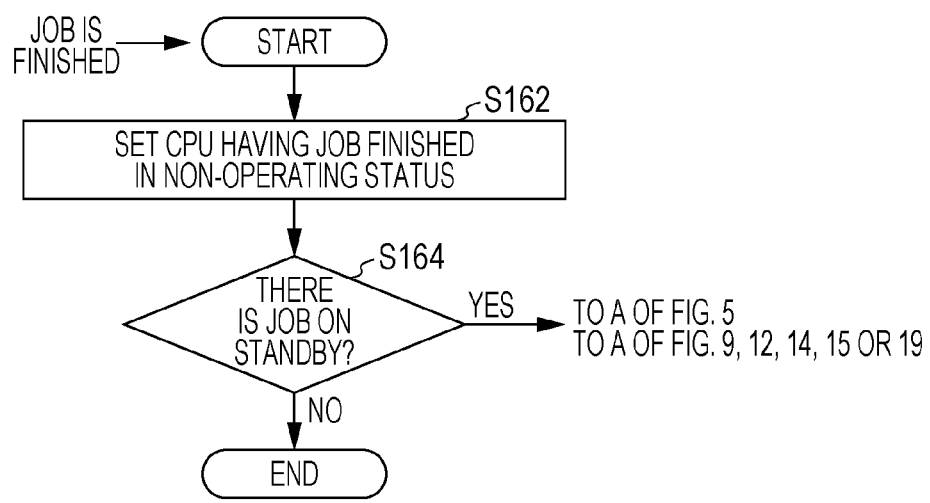
FIG. 6 is a flowchart illustrating an example of processing executed by the job allocation device illustrated in FIG. 1 upon completion of the job.

FIG. 6 illustrates an example of processing executed by the job allocation device illustrated in FIG. 1 upon completion of the job. The flow illustrated in FIG. 6 is processed by the job allocation device 10 executing the program PGM. More specifically, FIG. 6 illustrates an example of the method for controlling the information processing equipment IPE. The flow illustrated in FIG. 6 is started based on the completion of the job executed by the CPU.

First, in Step S162, the job allocation device 10 sets the region of "operating status" corresponding to the CPU finished with the job to "non-operating" (in other words, "0") in the table TBL3. Next, in Step S164, the job allocation device 10 determines whether or not there is a job placed on standby in Step S150 illustrated in FIG. 5. When there is a job on standby, the processing moves to Step S102 in FIG. 5, and a job is submitted to any of the CPUs. On the other hand, when there is no job on standby, the processing is terminated. Note that the processing of Step S164 in FIG. 6 is executed also when there is a job placed on standby in Step S250 in FIG. 9, Step S350 in FIGS. 12, 14, and 15, and Step S450 in FIG. 19.

As described above, in the embodiment illustrated in FIGS. 1 to 6, since the job allocation device 10 allocates the job to the CPU based on the position of the non-operating CPU on the supply channel 50, the heat generated by the CPU may be efficiently absorbed by the coolant compared with the conventional technology. As a result, the power consumed by the air conditioner to cool the room where the information processing equipment IPE is installed may be suppressed. Thus, the power consumed by the operation of the information processing equipment IPE may be suppressed. Moreover, the job allocation device 10 allocates the job to the CPU based on the cooling efficiency. Thus, occurrence of failures in the information processing equipment IPE due to the overheated CPU may be suppressed.

Figure 7:
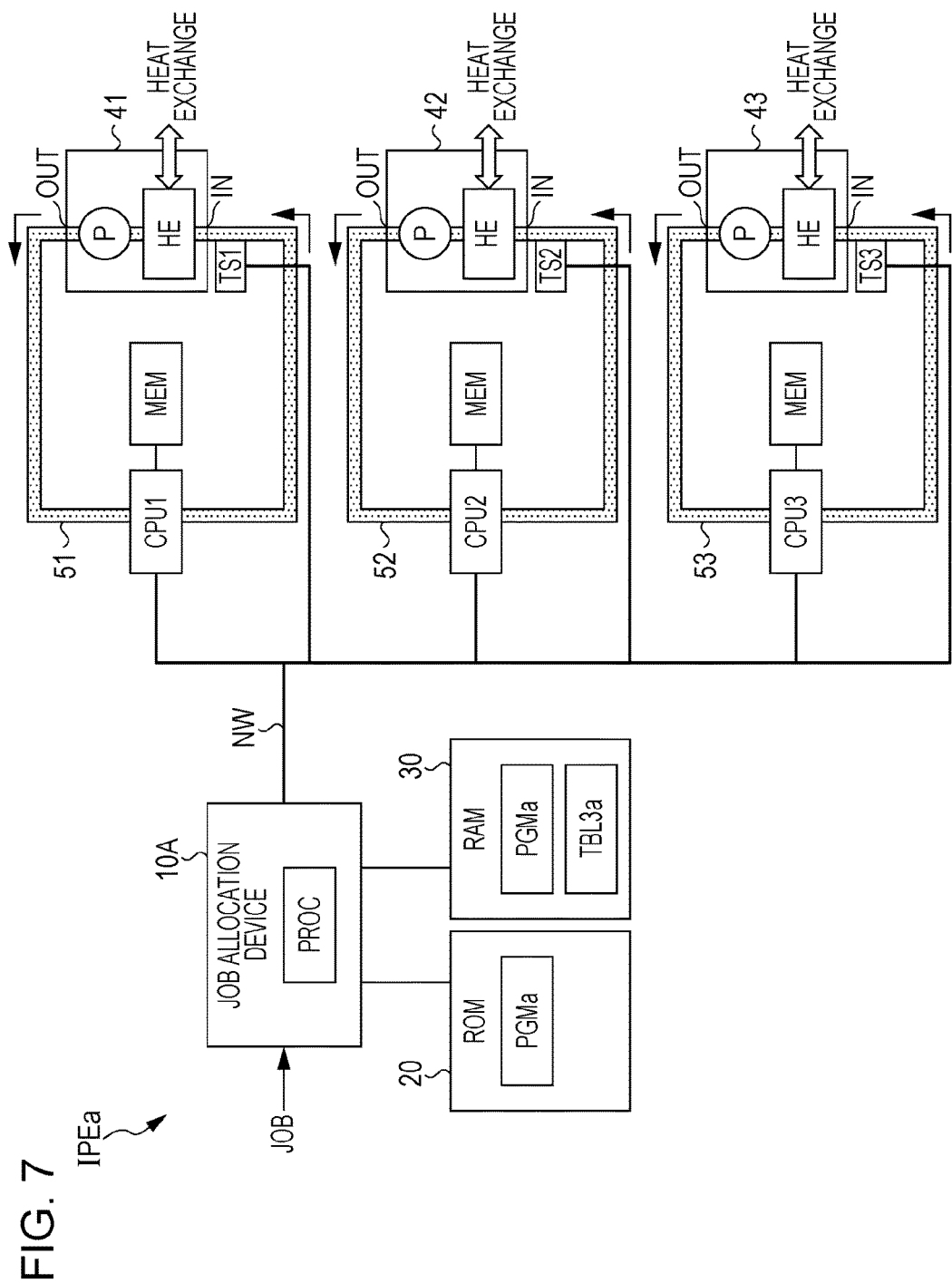
FIG. 7 is a diagram illustrating another embodiment of information processing equipment and a method and a program for controlling the information processing equipment.

FIG. 7 illustrates another embodiment of information processing equipment and a method and a program for controlling the information processing equipment. The same or similar elements as or to those described in the embodiment illustrated in FIGS. 1 to 6 are denoted by the same reference numerals, and detailed description thereof is omitted. Information processing equipment IPEa illustrated in FIG. 7 includes a job allocation device 10A instead of the job allocation device 10 illustrated in FIG. 1.

A ROM 20 stores a program PGMa instead of the program PGM illustrated in FIG. 1, and the table TBL2 illustrated in FIG. 1 is not allocated thereto. A RAM 30 stores a program PGMa instead of the program PGM illustrated in FIG. 1, and a table TBL3a, instead of the table TBL3 illustrated in FIG. 1, is allocated thereto. FIG. 8 illustrates an example of information stored in the table TBL3a. The information processing equipment IPEa also includes Central Processing Unit s (CPU1, CPU2, and CPU3) and memories MEMs connected to the CPU1 to CPU3, respectively.

For example, the program PGMa stored in the RAM 30 is transferred from the ROM 20 when the information processing equipment IPEa is turned on. The program PGMa transferred from the ROM 20 to the RAM 30 is executed by the job allocation device 10A. The program PGMa is an example of a control program for the information processing equipment IPEa to allocate jobs to the CPU1 to CPU3.

The information processing equipment IPEa further includes circulating devices 41 to 43 for coolants, supply channels 51 to 53, through which the coolants flow, and temperature sensors TSs (TS1 to TS3), all of which correspond to the CPU1 to CPU3, respectively. More specifically, each of the CPU1 to CPU3 is cooled by the coolant circulated through each of the supply channels 51 to 53 by each of the circulating devices 41 to 43, which are operated independently of each other. Note that the number of the CPUs and the number of the supply channels 51 to 53 are not limited to three. Likewise, the number of the circulating devices 41 to 43 provided in the information processing equipment IPEa is not limited to three. For example, one circulating device may supply the coolant to the three supply channels 51 to 53.

The circulating device 41, the supply channel 51, and the coolant flowing through the supply channel 51 constitute a cooling system for cooling the CPU1. The circulating device 42, the supply channel 52, and the coolant flowing through the supply channel 52 constitute a cooling system for cooling the CPU2. The circulating device 43, the supply channel 53, and the coolant flowing through the supply channel 53 constitute a cooling system for cooling the CPU3.

For example, the circulating devices 41 to 43 are the same or similar devices as or to the circulating device 40 illustrated in FIG. 1. A structure of a contact portion between the CPU1 and the supply channel 51, a structure of a contact portion between the CPU2 and the supply channel 52, and a structure of a contact portion between the CPU3 and the supply channel 53 are the same as or similar to the structure illustrated in FIG. 3.

The temperature sensors TS1 to TS3 measure the temperatures of the coolants returned to inlets IN of the circulating devices 41 to 43, respectively. More specifically, the temperature sensors TS1 to TS3 measure the temperatures of the coolants, which are increased as the coolants absorb heat generated by the CPU1 to CPU3. The temperature sensors TS1 to TS3 are connected to the job allocation device 10A through a network NW. The job allocation device 10A monitors the temperature of the coolants measured by the temperature sensors TS1 to TS3, and determines that the cooling system with a lower temperature of the coolant has a higher ability to cool the CPU.

Note that the temperature of the coolant flowing through the supply channel 51 between the CPU1 and the inlet IN is substantially unchanged. Likewise, the temperature of the coolant flowing through the supply channel 52 between the CPU2 and the inlet IN is substantially unchanged, and the temperature of the coolant flowing through the supply channel 53 between the CPU3 and the inlet IN is substantially unchanged. Therefore, each of the temperature sensors TS1 to TS3 may be disposed at any position between the inlet IN and each of the CPU1 to CPU3. Alternatively, each of the temperature sensors TS1 to TS3 may be disposed inside each of the circulating devices 41 to 43.

FIG. 8 illustrates an example of the information stored in the RAM 30 illustrated in FIG. 7. As for the same or similar elements as or to those illustrated in FIG. 2, detailed description thereof is omitted. The table TBL3a allocated to the RAM 30 includes a region for storing information indicating an operating status of each of the CPU1 to CPU3 and a region for storing "coolant temperature information" relatively indicating the temperatures of the coolants flowing through the supply channels 51 to 53 connected to the CPU1 to CPU3. The region for "operating status" stores information indicating "operating" or "non-operating" as in the case of FIG. 2.

The region for "coolant temperature information", for example, stores numbers indicating the ascending order of temperature, based on the temperatures of the coolants measured by the temperature sensors TS1 to TS3. In the example illustrated in FIG. 8, the temperature of the coolant that cools the CPU1 is lower than those of the coolants that cool the CPU2 and CPU3, and the temperature of the coolant that cools the CPU3 is lower than that of the coolant that cools the CPU2.

The CPU1 to CPU3 are cooled by the coolants flowing through the supply channels 51 to 53 independent of each other. Thus, the temperature of the coolant is likely to be higher for the CPU having a higher operation frequency than the other CPUs or for the CPU which executes a job that is more complex than those executed by the other CPUs.

For example, the job allocation device 10A illustrated in FIG. 7 acquires the temperatures of the coolants measured by the temperature sensors TS1 to TS3 at a predetermined frequency higher than a job submission frequency, and stores the numbers indicating relative temperatures in the region of "coolant temperature information" based on the acquired temperatures.

Figure 9:
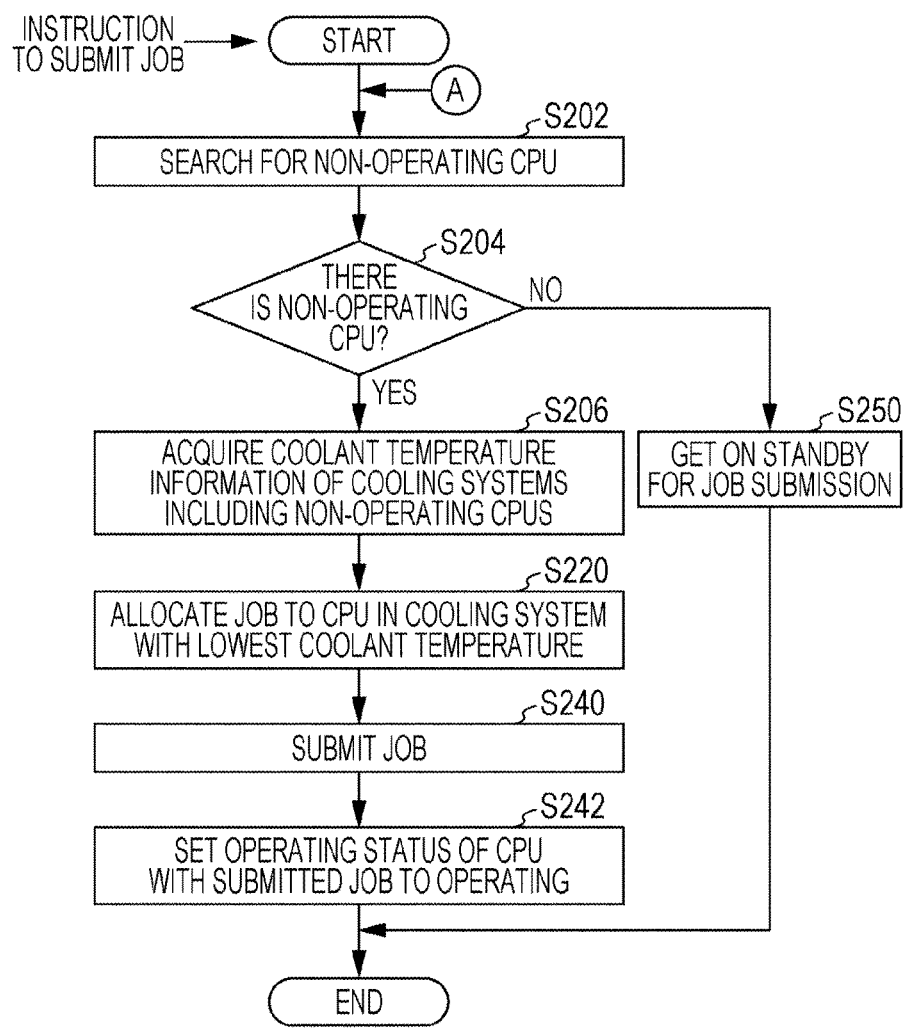
FIG. 9 is a flowchart illustrating an example of processing executed by a job allocation device illustrated in FIG. 7 upon submission of a job.

FIG. 9 illustrates an example of processing executed by the job allocation device 10A illustrated in FIG. 7 upon submission of a job. As for the same or similar processing as or to that illustrated in FIG. 5, detailed description thereof is omitted. The flow illustrated in FIG. 9 is processed by the job allocation device 10A executing the program PGMa. More specifically, FIG. 9 illustrates an example of a method and a program for controlling the information processing equipment IPEa.

The processing of Steps S202, S204, S240, S242, and S250 is the same as or similar to the processing of Steps S102, S104, S140, S142, and S150 illustrated in FIG. 5. The processing illustrated in FIG. 9 is started based on an instruction to submit a job received from a higher-level device, or is started when there is a job placed on standby in Step S250, as in the case of the processing described with reference to FIG. 6.

When there is a non-operating CPU upon submission of a job, the job allocation device 10A refers to the table TBL3a illustrated in FIG. 8 to acquire information indicating the temperature of the coolant flowing through the cooling system including the non-operating CPU, in Step S206. From the table TBL3a illustrated in FIG. 8, for example, the job allocation device 10A acquires "1", "3", and "2" as the coolant temperature information corresponding to the CPU1 to CPU3, respectively.

Next, in Step S220, the job allocation device 10A allocates a job to the CPU connected to the cooling system with the lowest temperature of the coolant, based on the information acquired in Step S206. Based on the table TBL3a illustrated in FIG. 8, for example, the job allocation device 10A determines to allocate a job to the CPU1 connected to the cooling system with the smallest value stored as the coolant temperature information. Then, as in the case of FIG. 5, the job allocation device 10A submits the job to the CPU in Step S240.

In the above embodiment illustrated in FIGS. 7 to 9, when the CPUs are cooled by the coolants flowing through the supply channels 51 to 53, respectively, the job allocation device 10A determines the CPU to which the job is to be allocated, according to the temperature of the coolant. Thus, as in the case of the embodiment illustrated in FIGS. 1 to 6, the power consumed by the operation of the information processing equipment IPEa may be suppressed. As a result, occurrence of failures in the information processing equipment IPEa due to the overheated CPU may be suppressed.

Figure 10:
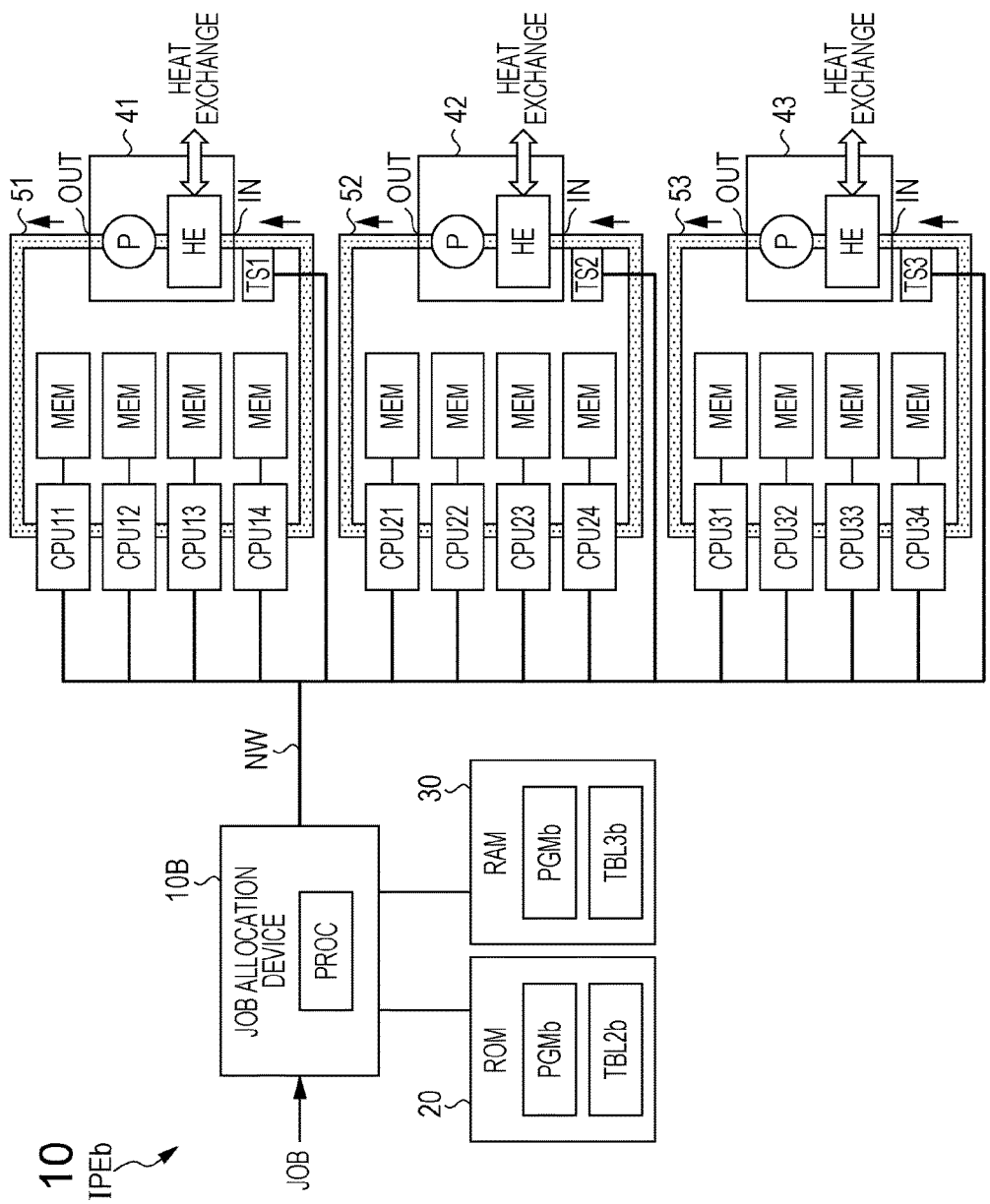
FIG. 10 is a diagram illustrating another embodiment of information processing equipment and a method and a program for controlling the information processing equipment.

FIG. 10 illustrates another embodiment of information processing equipment and a method and a program for controlling the information processing equipment. The same or similar elements as or to those described in the embodiment illustrated in FIGS. 1 to 9 are denoted by the same reference numerals, and detailed description thereof is omitted. Information processing equipment IPEb illustrated in FIG. 10 includes a job allocation device 10B instead of the job allocation device 10A illustrated in FIG. 7.

A ROM 20 stores a program PGMb instead of the program PGM illustrated in FIG. 1, and a table TBL2b, instead of the table TBL2 illustrated in FIG. 1, is allocated thereto. A RAM 30 stores a program PGMb instead of the program PGM illustrated in FIG. 1, and a table TBL3b, instead of the table TBL3 illustrated in FIG. 1, is allocated thereto. FIG. 11 illustrates an example of the tables TBL2b and TBL3b. For example, the program PGMb stored in the RAM 30 is transferred from the ROM 20 when the information processing equipment IPEb is turned on.

The information processing equipment IPEb also includes CPUs (CPU11 to CPU14, CPU21 to CPU24, and CPU31 to CPU34) which come into contact with supply channels 51 to 53, respectively. The CPUs are connected to memories MEMs. A configuration of a cooling system in the information processing equipment IPEb illustrated in FIG. 10 is the same as that illustrated in FIG. 7, except that the CPUs come into contact with the cooling systems illustrated in FIG. 7. Note that the number of the CPUs to be cooled by each of the supply channels 51 to 53 is not limited to four. The numbers of the CPUs to be cooled by the supply channels 51 to 53 may differ from each other.

The program PGMb transferred from the ROM 20 to the RAM 30 is executed by the job allocation device 10B. The program PGMb is an example of a control program for the information processing equipment IPEb to allocate jobs to the CPU11 to CPU14, CPU21 to CPU24, and CPU31 to CPU34.

FIG. 11 illustrates an example of the information stored in the ROM 20 and the RAM 30 illustrated in FIG. 10. As for the same or similar elements as or to those illustrated in FIGS. 2 and 8, detailed description thereof is omitted.

The table TBL2b allocated to the ROM 20 includes a region for storing information (mounting position) indicating the position of each of the CPU on the supply channel 51 (52 or 53) for each of the cooling systems (in other words, the supply channels 51 to 53).

The table TBL3b allocated to the RAM 30 includes a region for storing the information of the "mounting position", a region for storing information indicating the operating status of each CPU, and a region for storing "coolant temperature information" relatively indicating the temperatures of the coolants flowing through. The information of the "mounting position" is transferred from the table TBL2b to the table TBL3b when the information processing equipment IPEb is turned on.

Figure 12:
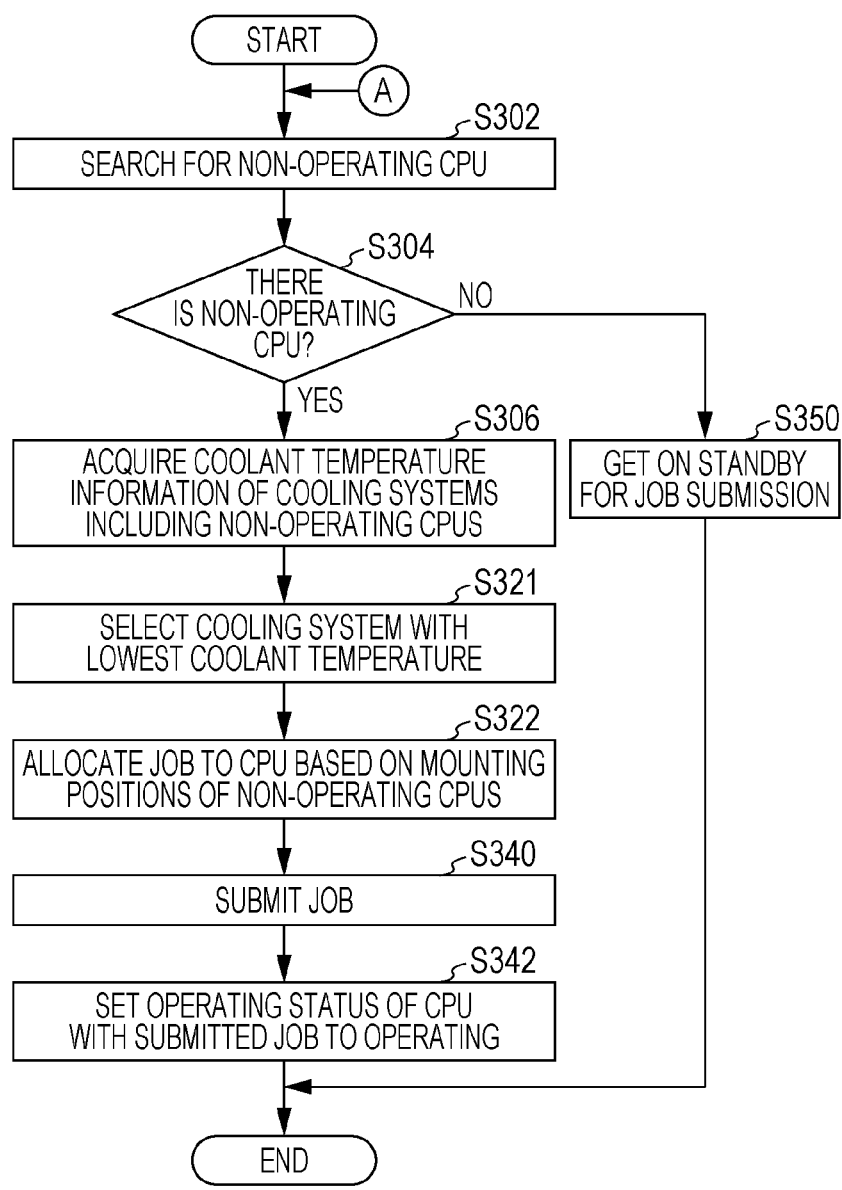
FIG. 12 is a flowchart illustrating an example of processing executed by a job allocation device illustrated in FIG. 10 upon submission of a job.

FIG. 12 illustrates an example of processing executed by the job allocation device 10B illustrated in FIG. 10 upon submission of a job. As for the same or similar processing as or to those illustrated in FIGS. 5 and 9, detailed description thereof is omitted. The flow illustrated in FIG. 12 is processed by the job allocation device 10B executing the program PGMb. More specifically, FIG. 12 illustrates an example of a method and a program for controlling the information processing equipment IPEb.

The processing of Steps S302, S304, S306, S340, S342, and S350 is the same as or similar to the processing of Steps S202, S204, S206, S240, S242, and S250 illustrated in FIG. 9. The processing illustrated in FIG. 12 is started based on an instruction to submit a job received from a higher-level device, or is started when there is a job placed on standby in Step S350, as in the case of the processing described with reference to FIG. 6.

When there is a non-operating CPU upon submission of a job, the job allocation device 10B refers to the table TBL3b illustrated in FIG. 11 to acquire information indicating the temperature of the coolant flowing through the cooling system including the non-operating CPU, in Step S306. From the table TBL3b illustrated in FIG. 11, for example, the job allocation device 10B acquires "2", "3", and "1" as the coolant temperature information corresponding to the CPU1 to CPU3, respectively.

Next, in Step S321, the job allocation device 10B selects a cooling system in which the temperature of the coolant is lower than those in the other cooling systems, based on the information acquired in Step S306.

Then, in Step S322, the job allocation device 10B reads the information of "mounting position" corresponding to the non-operating CPU, by referring to the table TBL3b, as in the case of Step S122 illustrated in FIG. 5. From the table TBL3b illustrated in FIG. 11, for example, the job allocation device 10B reads the information of "mounting position" of the non-operating CPU32 and CPU34 among the CPU31 to CPU34 connected to the cooling system with the coolant temperature information of "1". Then, the job allocation device 10B allocates a job to the CPU with the smallest value stored in "mounting position". According to the table TBL3b illustrated in FIG. 11, for example, the job allocation device 10B allocates a job to the CPU32 with a smaller value stored in "mounting position" between the CPU32 and CPU34. Next, in Step S340, the job allocation device 10A submits the job allocated in Step S322 to the CPU.

In the above embodiment illustrated in FIGS. 10 to 12, when the CPUs are cooled by the coolants flowing through the supply channels 51 to 53, the job allocation device 10B allocates the job to the CPU according to the temperature of the coolant and the position of the non-operating CPU on each of the supply channels 51 to 53. Thus, as in the case of the embodiments illustrated in FIGS. 1 to 9, the power consumed by the operation of the information processing equipment IPEb may be suppressed. As a result, occurrence of failures in the information processing equipment IPEb due to the overheated CPU may be suppressed.

FIG. 13 illustrates an example of information stored in a ROM and a RAM according to another embodiment of the information processing equipment. A configuration of the information processing equipment according to the embodiment illustrated in FIG. 13 is the same as that of the information processing equipment IPEb illustrated in FIG. 10, except that information stored in the ROM 20 and the RAM 30 is different.

A ROM 20 stores a program PGMd instead of the program PGMb illustrated in FIG. 11, and information stored in a table TBL2b allocated to the ROM 20 is the same as that stored in the table TBL2b illustrated in FIG. 11. A RAM 30 stores a program PGMd instead of the program PGMb illustrated in FIG. 11, and a table TBL3d, instead of the table TBL3b illustrated in FIG. 11, is allocated thereto. The program PGMd stored in the RAM 30, for example, is transferred from the ROM 20 when the information processing equipment IPEb is turned on. The program PGMd transferred from the ROM 20 to the RAM 30 is executed by the job allocation device 10B illustrated in FIG. 10. The program PGMd is an example of a control program for the information processing equipment IPEb to allocate jobs to the CPU11 to CPU14, CPU21 to CPU24, and CPU31 to CPU34.

The table TBL3d allocated to the RAM 30 is the same as the table TBL3b illustrated in FIG. 11, except that information indicating the temperatures of the coolants measured by temperature sensors TS1 to TS3 is stored in a region for "coolant temperature information". For example, the information of "mounting position" stored in the RAM 30 is transferred from the table TBL2b in the ROM 20 when the information processing equipment IPEb is turned on.

Figure 14:
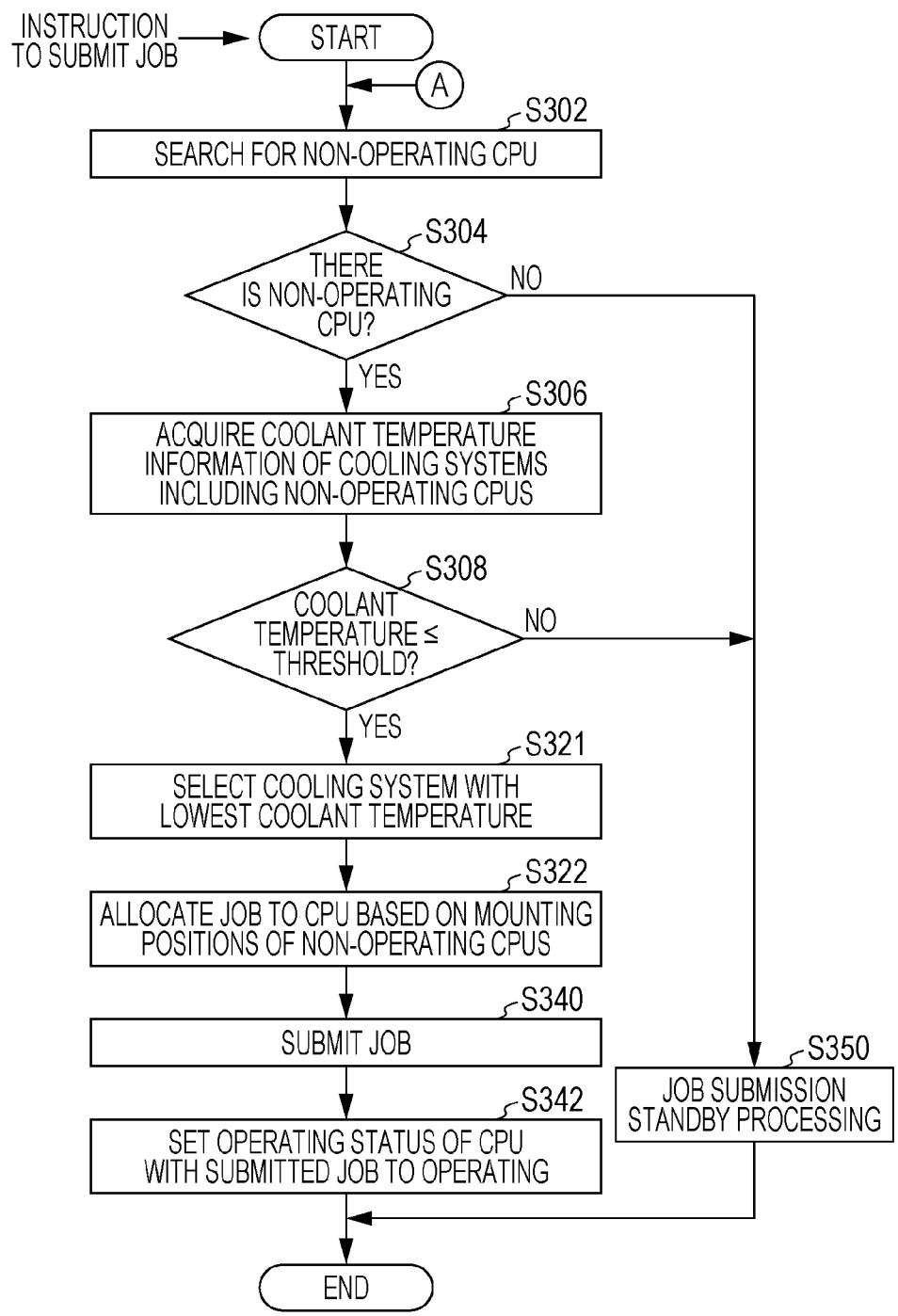
FIG. 14 is a flowchart illustrating an example of processing executed by a job allocation device in the information processing equipment including the ROM and the RAM illustrated in FIG. 13 upon submission of a job.

FIG. 14 illustrates an example of processing executed by the job allocation device in the information processing equipment including the ROM 20 and the RAM 30 illustrated in FIG. 13 upon submission of a job. In FIG. 14, as for the same or similar processing as or to that illustrated in FIGS. 5, 9, and 12, detailed description thereof is omitted. The flow illustrated in FIG. 14 is processed by the job allocation device 10B, in the information processing equipment IPEb illustrated in FIG. 10, executing the program. More specifically, FIG. 14 illustrates an example of a method and a program for controlling the information processing equipment IPEb.

The flow illustrated in FIG. 14 is the same as that illustrated in FIG. 12, except that Step S308 is added between Steps S306 and S321. From the table TBL3d illustrated in FIG. 13, for example, the job allocation device 10B acquires "32° C.", "37° C.", and "28° C." as the coolant temperature information indicating the temperatures of the coolants in the three cooling systems.

In Step S308, the job allocation device 10B determines whether or not the "coolant temperature information" indicating the temperature of the coolant stored in the table TBL3d is not more than a threshold in the cooling system including a non-operating CPU. The threshold is 35° C. (35 degrees Celsius), for example. Note that the threshold is determined according to the maximum allowable temperature of the CPU, the cooling abilities of the circulating devices 41 to 43, and the like, and is not limited to 35° C. In the table TBL3d illustrated in FIG. 13, for example, the job allocation device 10B compares the threshold with the coolant temperatures indicated by the coolant temperature information of the three cooling systems to which non-operating CPUs are connected. Since there are cooling systems with the coolant temperatures of "32° C." and "28° C.", which are below the threshold, the job allocation device 10B executes the processing from Step S321.

On the other hand, when the coolant temperatures in all the cooling systems exceed the threshold, the job allocation device 10B moves the processing to Step S350. Thus, the temperatures of the coolants exceeding the threshold may be suppressed from being further increased by job submission. As a result, occurrence of failures in the information processing equipment IPEb due to the overheated CPU may be suppressed. Note that, when there is one cooling system with the temperature of the coolant not more than the threshold, the processing of Step S321 may be omitted. Moreover, when the coolant temperature in any of the cooling systems exceeds the threshold, the job allocation device 10B may move the processing to Step S250.

Note that Step S308 may be added between Steps S206 and S220 illustrated in FIG. 9. In this case, the table TBL3a illustrated in FIG. 8 stores information indicating the temperatures of the coolants measured by the temperature sensors TS1 to TS3 as the "coolant temperature information".

In the above embodiment illustrated in FIGS. 13 and 14, as in the case of the embodiment illustrated in FIGS. 10 to 12, power consumed by an air conditioner configured to cool a room where the information processing equipment IPEb is installed may be suppressed by the operation of the information processing equipment IPEb. Furthermore, in the embodiment illustrated in FIGS. 13 and 14, when the temperature of the coolant exceeds the threshold, the job submission is suppressed. Thus, the temperature of the coolant exceeding the threshold may be suppressed from being further increased by the job submission. More specifically, occurrence of failures in the information processing equipment IPEb due to the overheated CPU may be suppressed by directly monitoring the temperature of the coolant and controlling the job submission.

Figure 15:
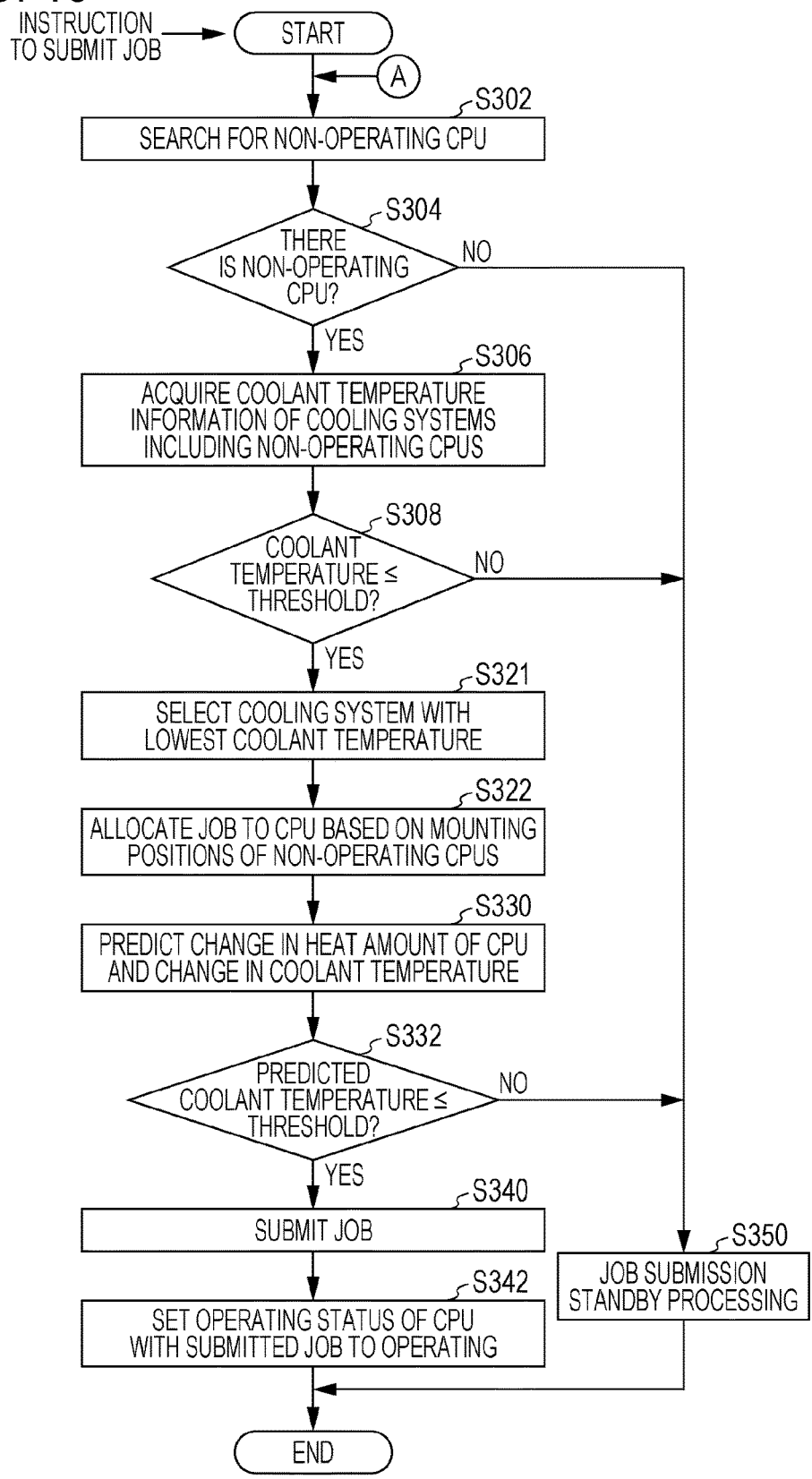
FIG. 15 is a flowchart illustrating an example of processing executed by a job allocation device according to another embodiment of the information processing equipment upon submission of a job.

FIG. 15 illustrates an example of processing executed by a job allocation device according to another embodiment of the information processing equipment upon submission of a job. In FIG. 15, as for the same or similar processing as or to those illustrated in FIGS. 5, 9, 12, and 14, detailed description thereof is omitted.

A configuration of the information processing equipment including the job allocation device that executes the processing illustrated in FIG. 15 is the same as that of the information processing equipment IPEb illustrated in FIG. 10, except that programs stored in a ROM 20 and a RAM 30 are different. More specifically, FIG. 15 illustrates an example of a method and a program for controlling the information processing equipment IPEb.

The flow illustrated in FIG. 15 is the same as that illustrated in FIG. 14, except that Steps S330 and S332 are added between Steps S322 and S340. In Step S330, the job allocation device 10B predicts a change in amount of heat generated by the CPU due to job submission, and predicts a change in temperature of the coolant with the change in the amount of heat generated.

For example, the job allocation device 10B predicts a change in amount of heat generated by the CPU, based on information indicating a change in amount of heat generated by the CPU due to a job held in the RAM 30 and submitted in the past. The amount of heat generated by the CPU is calculated, for example, based on an amount of power consumed by the CPU executing a job. The job allocation device 10B also predicts a change in temperature of the coolant, based on information indicating a change in temperature of the coolant due to the job held in the RAM 30 and submitted in the past.

Next, when the predicted temperature of the coolant after the job submission is not more than a threshold (for example, 35° C. (35 degrees Celsius)) in Step S332, the job allocation device 10B submits a job in Step S340. When the predicted temperature of the coolant after the job submission exceeds the threshold, the job allocation device 10B suppresses the job submission and executes standby processing in Step S350.

By predicting the change in temperature of the coolant due to the job submission, based on the change in amount of heat generated by the CPU and the change in temperature of the coolant due to the job submitted in the past, the temperature of the coolant may be suppressed from exceeding the threshold due to the job submission. Thus, as in the case of the processing in Step S308, occurrence of failures in the information processing equipment IPEb due to the overheated CPU may be suppressed. Note that, when the predicted change in temperature of the coolant approximately coincides with an actual change in temperature of the coolant, the determination in Step S308 may be omitted. Moreover, Steps S330 and S332 may be added between Steps S220 and S240 illustrated in FIG. 9. In this case, the table TBL3a illustrated in FIG. 8 stores information indicating the temperatures of the coolants measured by the temperature sensors TS1 to TS3 as the "coolant temperature information".

In the above embodiment illustrated in FIG. 15, as in the case of the embodiment illustrated in FIGS. 10 to 12, the power consumed by the operation of the information processing equipment IPEb may be suppressed. Furthermore, as in the case of the embodiment illustrated in FIGS. 13 and 14, occurrence of failures in the information processing equipment IPEa due to the overheated CPU may be suppressed.

Figure 16:
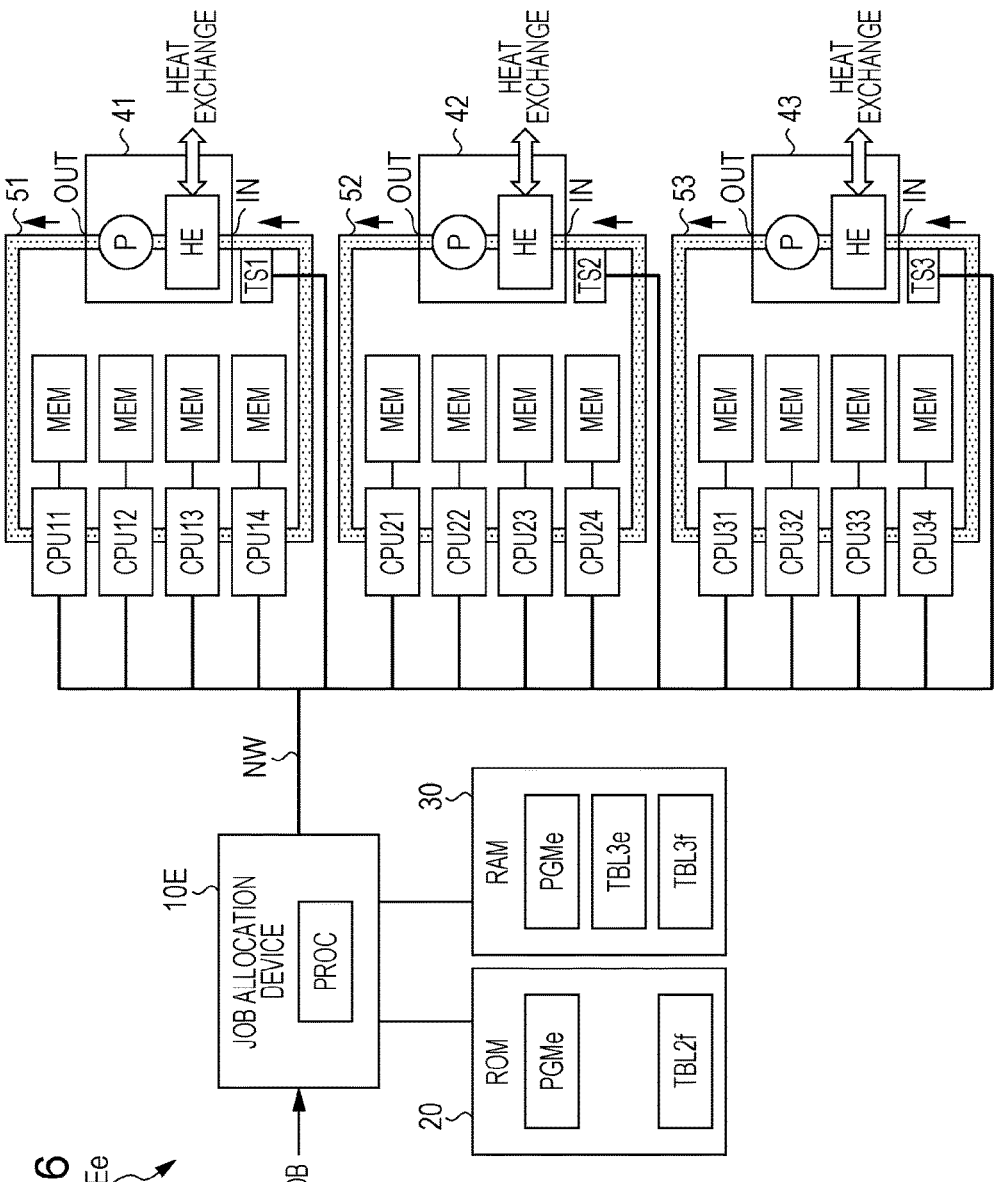
FIG. 16 is a diagram illustrating another embodiment of information processing equipment and a method and a program for controlling the information processing equipment.

FIG. 16 illustrates another embodiment of information processing equipment and a method and a program for controlling the information processing equipment. The same or similar elements as or to those described in the embodiments illustrated in FIGS. 1 to 15 are denoted by the same reference numerals, and detailed description thereof is omitted. Information processing equipment IPEe illustrated in FIG. 16 includes a job allocation device 10E instead of the job allocation device 10B illustrated in FIG. 10. The job allocation device 10E has a function to allocate one job to more than one CPU. In other words, one job occupies more than one CPU. For example, the information processing equipment IPEe is the same as the information processing equipment IPEb illustrated in FIG. 10, except that the information processing equipment IPEe includes the job allocation device 10E instead of the job allocation device 10B and information stored in a ROM 20 and a RAM 30 is different.

The ROM 20 stores a program PGMe instead of the program PGMb illustrated in FIG. 10, and a table TBL2f, instead of the table TBL2b illustrated in FIG. 10, is allocated thereto. The RAM 30 stores a program PGMe instead of the program PGMb illustrated in FIG. 10, and tables TBL3e and TBL3f, instead of the table TBL3b illustrated in FIG. 10, are allocated thereto. FIG. 17 illustrates an example of the table TBL3e. FIG. 18 illustrates an example of the tables TBL2f and TBL3f.

For example, the program PGMe stored in the RAM 30 is transferred from the ROM 20 when the information processing equipment IPEe is turned on. The program PGMe transferred from the ROM 20 to the RAM 30 is executed by the job allocation device 10E. The program PGMe is an example of a control program for the information processing equipment IPEe to allocate jobs to be submitted to CPU11 to CPU14, CPU21 to CPU24, and CPU31 to CPU34. For example, the transfer of the program PGMe from the ROM 20 to the RAM 30 is executed when the information processing equipment IPEe is turned on.

FIG. 17 illustrates an example of information stored in the table TBL3e allocated to the RAM 30 illustrated in FIG. 16. As for the same or similar elements as or to those illustrated in FIG. 13, detailed description thereof is omitted. The left-hand side of FIG. 17 illustrates an example of the information stored in the table TBL3e, and the right-hand side of FIG. 17 illustrates another example of the information stored in the table TBL3e.

The table TBL3e includes a region for storing information indicating an operating status of each CPU and a region for storing "coolant temperature information" indicating the temperature of a coolant flowing through each cooling system. More specifically, the table TBL3e is the same as the table TBL3d illustrated in FIG. 13, except that the table TBL3e includes no region for storing information indicating "mounting position". The table TBL3e on the left-hand side of FIG. 17 illustrates an example where the CPU13, CPU22, and CPU32 are not operating, while the table TBL3e on the right-hand side of FIG. 17 illustrates an example where the CPU13, CPU22, and CPU31 are not operating.

FIG. 18 illustrates an example of information stored in the tables TBL2f and TBL3f allocated to the ROM 20 and the RAM 30 illustrated in FIG. 16. For example, the information in the table TBL2f is transferred to the table TBL3f when the information processing equipment IPEe is turned on. Since the tables TBL2f and TBL3f store the same information, the table TBL2f is described below. Note that the thick squares and thick circles indicated in the tables TBL2f and TBL3f in FIG. 18 are used for description of a flow illustrated in FIG. 19, and thus are not information stored in the tables TBL2f and TBL3f.

The table TBL2f includes a region for storing information indicating communication performance when information is communicated between two CPUs mounted on the information processing equipment IPEe. The communication of information between the CPUs may be executed through a network NW, or the CPUs may be connected to each other through a communication path other than the network NW.

In the example illustrated in FIG. 18, the table TBL2f stores the communication performance indicated by numerical values. Each of the values indicates time (latency) between transmission of information by any of the CPUs and reception of the information by the other CPU. Therefore, as to the communication performance, the smaller the value, the higher the communication performance, and the larger the value, the lower the communication performance. Note that the information indicating the communication performance stored in the table TBL2f may be the number of clock cycles between the transmission of information by any of the CPUs and the reception of the information by the other CPU.

Note that the information processing equipment IPEe may operate as a parallel computer system, in which nodes (information processing equipment) including CPUs and memories MEMs are mesh-connected or torus-connected through switches. In this case, communication between two nodes is executed through a predetermined number of switches.

Since the job allocation device 10E illustrated in FIG. 16 allows two CPUs to execute one job, for example, the table TBL2f stores information indicating communication performance between the two CPUs. When the job allocation device 10E allows three CPUs to execute one job, for example, the table TBL2f stores information indicating communication performance among the three CPUs. When the job allocation device 10E allows four CPUs to execute one job, for example, the table TBL2f stores information indicating communication performance among the four CPUs. Alternatively, when the number of the CPUs to execute the job varies according to the size of the job, the table TBL2f may store information indicating communication performance between two CPUs, among three CPUs, and among four CPUs, respectively.

Figure 19:
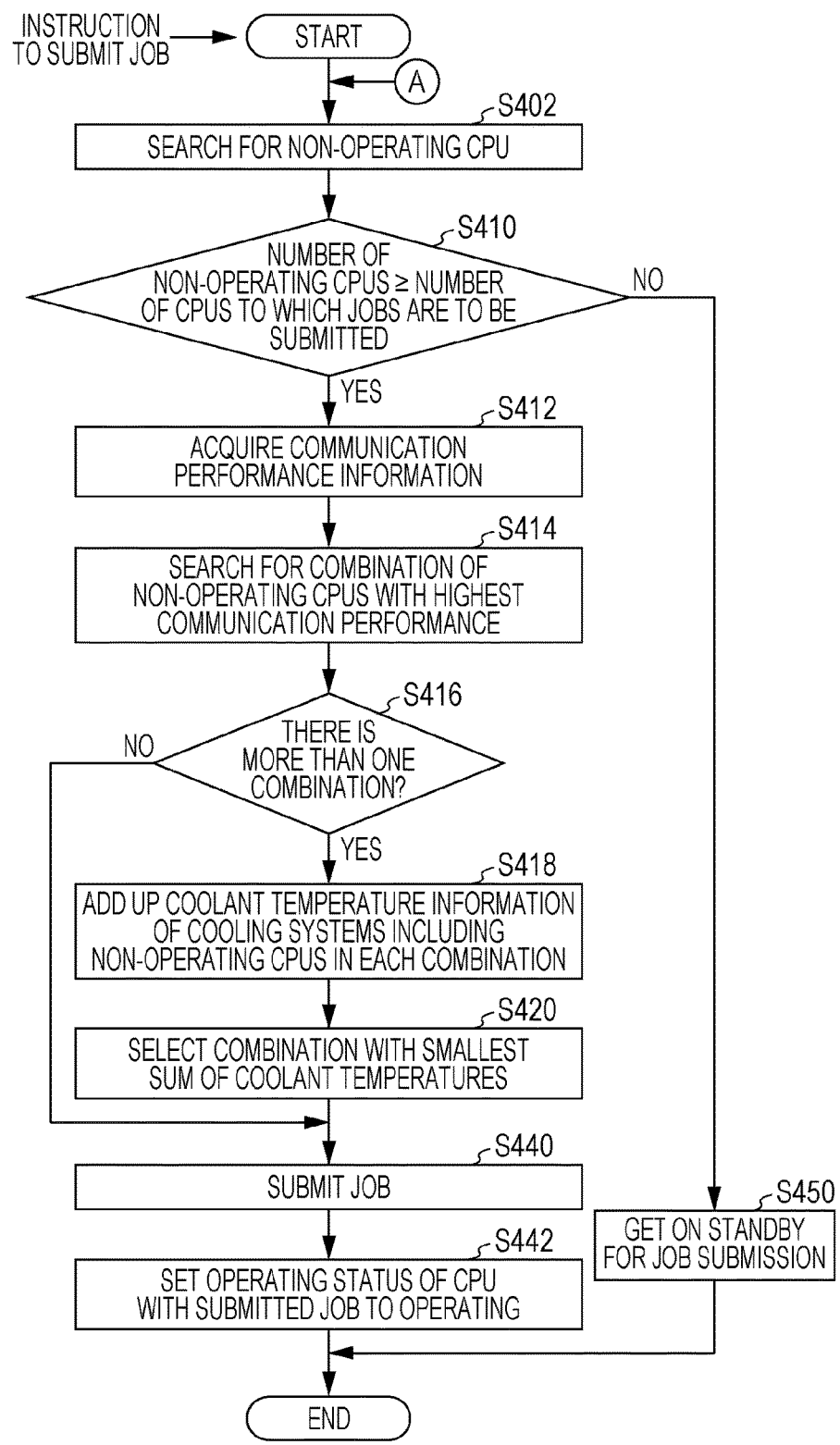
FIG. 19 is a flowchart illustrating an example of processing executed by a job allocation device illustrated in FIG. 16 upon submission of a job.

FIG. 19 illustrates an example of processing executed by the job allocation device 10E illustrated in FIG. 16 upon submission of a job. In FIG. 19, as for the same or similar processing as or to that illustrated in FIG. 5, detailed description thereof is omitted. For example, the flow illustrated in FIG. 19 is processed by the job allocation device 10E, in the information processing equipment IPEe illustrated in FIG. 16, executing the program PGMe. More specifically, FIG. 19 illustrates an example of a method and a program for controlling the information processing equipment IPEe.

The processing of Steps S402, S440, S442, and S450 is the same as or similar to the processing of Steps S102, S140, S142, and S150 illustrated in FIG. 5. The processing illustrated in FIG. 19 is started based on an instruction to submit a job received from a higher-level device, or is started when there is a job placed on standby in Step S450, as in the case of the processing described with reference to FIG. 6.

First, in Step S402, upon receipt of the instruction to submit a job from the higher-level device, the job allocation device 10E searches for a non-operating CPU by referring to the table TBL3e illustrated in FIG. 17. Next, in Step S410, the job allocation device 10E determines whether or not the number of non-operating CPUs is not less than the number of CPUs to which jobs are to be submitted. More specifically, the job allocation device 10E determines whether or not a job may be submitted. Since the table TBL3f illustrated in FIG. 18 is used in this embodiment, for example, the job allocation device 10E determines whether or not the number of non-operating CPUs is not less than "2". In the table TBL3e (both the left-hand and right-hand sides) illustrated in FIG. 17, for example, the number of non-operating CPUs is "3".

When the number of non-operating CPUs is not less than the number of CPUs to which jobs are to be submitted, the processing moves to Step S412. On the other hand, when the number of non-operating CPUs is less than the number of CPUs to which jobs are to be submitted, the processing moves to Step S450. The job allocation device 10E executes job submission standby processing in Step S450, as in the case of Step S150 illustrated in FIG. 5, and then terminates the processing. Since the number of non-operating CPUs (in other words, "3") is not less than the number of CPUs to which jobs are to be submitted (in other words, "2") in the table TBL3e illustrated in FIG. 17, the processing moves to Step S412.

In Step S412, the job allocation device 10E acquires information indicating communication performance between two non-operating CPUs by referring to the table TBL3f illustrated in FIG. 18. When the table TBL3e on the left-hand side of FIG. 17 indicates the non-operating CPUs, for example, the job allocation device 10E acquires information indicating communication performance surrounded by the circles in FIG. 18. Meanwhile, when the table TBL3e on the right-hand side of FIG. 17 indicates the non-operating CPUs, the job allocation device 10E acquires information indicating communication performance surrounded by the squares in FIG. 18.

Next, in Step S414, the job allocation device 10E searches for a combination of CPUs with higher communication performance compared with the others, regarding the communication performance between two non-operating CPUs. The two non-operating CPUs are an example of a job non-execution arithmetic processing unit group that is executing no job. When the job allocation device 10E acquires in Step S412 the information indicating the communication performance surrounded by the circles in FIG. 18, for example, a combination of the CPU22 and CPU32 with the highest communication performance (in other words, "4") is selected from among the three combinations indicated by the three circles. On the other hand, when the job allocation device 10E acquires in Step S412 the information indicating the communication performance surrounded by the squares in FIG. 18, two combinations with the highest communication performance (in other words, "5") are selected from among the three combinations indicated by the three squares. More specifically, the combination of CPU13 and CPU22 and the combination of CPU22 and CPU32 are selected.

Thereafter, in Step S416, the job allocation device 10E determines whether or not there is more than one combination with communication performance higher than those of the others. When there is one combination (the combination of CPU22 and CPU32) with communication performance higher than those of the others, as indicated by the circle in FIG. 18, for example, the processing moves to Step S440. On the other hand, when there is more than one combination (the combination of CPU13 and CPU22 and the combination of CPU22 and CPU32) with communication performance higher than those of the others, as indicated by the squares in FIG. 18, the processing moves to Step S418.

In Step S418, the job allocation device 10E adds up the coolant temperature information of the cooling systems including the non-operating CPUs for each of the combinations searched in Step S414, based on the result of referring to the table TBL3e illustrated in FIG. 17. It is assumed, for example, that the job allocation device 10E acquires the information indicating the communication performance surrounded by the squares in FIG. 18, based on the information stored in the table TBL3e on the right-hand side of FIG. 17. More specifically, the job allocation device 10E selects, in Step S414, the combination of CPU13 and CPU22 and the combination of CPU22 and CPU31 with the information indicating the communication performance "5". In this case, the job allocation device 10E obtains "62° C." by adding up the coolant temperature (32° C.) in the cooling system including the CPU13 and the coolant temperature (30° C.) in the cooling system including the CPU22. The job allocation device 10E also obtains "58° C." by adding up the coolant temperature (30° C.) in the cooling system including the CPU22 and the coolant temperature (28° C.) in the cooling system including the CPU31.

Next, in Step S420, the job allocation device 10E selects a combination with the smaller sum of the coolant temperatures indicated by the coolant temperature information added up in Step S418. When the job allocation device 10E acquires the information indicating the communication performance surrounded by the squares in FIG. 18, based on the information stored in the table TBL3e on the right-hand side of FIG. 17, for example, the combination of CPU22 and CPU31 with the smaller sum of the coolant temperatures is selected. More specifically, the job allocation device 10E allocates a job to the combination of CPU22 and CPU31 with the smaller sum of the coolant temperatures compared with the others. Then, in Step S440, the job allocation device 10E submits a job to the two CPUs in the selected combination.

In the above embodiment illustrated in FIGS. 16 to 19, the job allocation device 10E searches for candidates for a combination of CPUs, to which a job is to be submitted, according to the communication performance between CPUs to execute the job. Then, the job allocation device 10E calculates the sum of the coolant temperatures for each of the searched candidates for the combination of CPUs, and submits the job to the candidate with the small sum of the temperatures. Thus, also when more than one CPU executes one job, power consumed by the operation of the information processing equipment IPEe may be suppressed. As a result, occurrence of failures in the information processing equipment IPEe due to the overheated CPU may be suppressed.

The features and advantages of the embodiment will become apparent from the above detailed description. The scope of claims is intended to cover the features and advantages of the embodiment as described above without departing from the spirit and scope of right thereof. Moreover, those having conventional knowledge in the field may easily conceive various modifications and changes. Therefore, the scope of the embodiment having the inventiveness is not intended to be limited to that described above, but may include modifications and equivalents which fall within the scope disclosed by the embodiment.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing equipment comprising:
processors provided in tandem and configured to execute jobs, respectively;
a supply channel including a loop shape, provided so as to come into contact with each of the processors and through which a coolant which absorbs heat generated by the processors flows;
a circulating device provided on the supply channel, including a pump and a heat exchanger and configured to circulate the coolant in the supply channel by receiving the coolant at an inlet from one of the processors through the supply channel and outputting the coolant at an outlet to the other one of the processors through the supply channel;
a memory configured to store information indicating a position of the respective processors from the outlet of the circulating device; and
a job allocation device coupled to the processors and configured to allocate a job, when allocating the jobs to the processors, to a processor which is included in the processors, executes no job and is located nearest the outlet of the circulating device based on the information.

2. An information processing equipment comprising:
processors configured to execute jobs, respectively;
a job allocation device coupled to the processors and configured to allocate a job, to the processors;
supply channels provided for the respective processors so as to come into contact with the respective processors, each including a loop shape and through which respective coolants which absorb heat generated by the respective processors flow;
circulating devices provided for the respective processors, each including a pump and a heat exchanger and configured to circulate the respective coolants in the respective supply channels by receiving the respective coolants at an inlet from the respective processors through the respective supply channels and outputting the respective coolants at an outlet to the respective processors through the respective supply channels;
temperature sensors disposed on a side of the inlet of the respective circulating devices in the respective supply channels and configured to measure temperatures of the respective coolants;

a memory configured to store information indicating the temperatures of the respective coolants of the respective processors; and a job allocation device coupled to the processors and configured to allocate a job, when allocating the jobs to the processors, to a processor which is included in the processors, executes no job and has the smallest temperature of the temperatures based on the information.

3. The information processing equipment according to claim 2, wherein two or more processors are provided for the respective supply channels and for the respective circulating devices as the respective processors.

4. The information processing equipment according to claim 3, wherein the job allocation device allocates the job to a processor which is included in the two or more processors and is located nearest the outlet of the respective circulating devices as the processor which is included in the processors, executes no job and has the smallest temperature of the temperatures.

5. The information processing equipment according to claim 3, wherein the job allocation device places submission of the allocated job on standby to the respective processor when the respective temperatures of the respective coolants are higher than a threshold.

6. The information processing equipment according to claim 5, wherein the job allocation device places submission of the allocated job on standby to the respective processor when the respective temperatures of the respective coolants are expected to get higher than the threshold by an execution of the allocated job by the respective processors.

7. The information processing equipment according to claim 2, wherein the job allocation device is configured to allocate the job to a pair of processors which is included in the processors, executes no job and has communication performance higher than communication performance of the remaining processors other than the pair of processors.

8. The information processing equipment according to claim 7, wherein the job allocation device is configured to allocate, when two or more pairs of processors having the higher communication performance exist as the pair of the pair of processors, the job to one of the two or more pairs of processors having a smallest total temperature of the temperatures of the coolants corresponding to each pair of the two or more pairs of processors.

9. A method for controlling information processing equipment comprising:

executing, by processors, jobs, respectively;

absorbing, by a coolant which flows in a supply channel including a loop shape and provided so as to come into contact with each of the processors, heat generated by the processors;

circulating, by a circulating device provided on the supply channel and including a pump and a heat exchanger, the coolant in the supply channel by receiving the coolant at an inlet from one of the processors through the supply channel and outputting the coolant at an outlet to the other one of the processors through the supply channel output the coolant;

storing, in a memory, information indicating a position of the respective processors from the outlet of the circulating device;

detecting, by a job allocation device coupled to the processors, one or more processors which are included in the processors and execute no job; and allocating, by the job allocation device, a processor which is included in the one or more processors and is located nearest the outlet of the circulating device based on the information.

* * * * *